(12) United States Patent
Fischer

(10) Patent No.: US 7,420,921 B2
(45) Date of Patent: Sep. 2, 2008

(54) AGGREGATED FRAGMENT ACKNOWLEDGEMENT IN LOCAL AREA NETWORK

(75) Inventor: Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1032 days.

(21) Appl. No.: 10/180,348

(22) Filed: Jun. 25, 2002

(65) Prior Publication Data
US 2003/0214930 A1 Nov. 20, 2003

Related U.S. Application Data

(60) Provisional application No. 60/381,542, filed on May 17, 2002.

(51) Int. Cl.
*H04L 1/00* (2006.01)
*H04L 12/26* (2006.01)

(52) U.S. Cl. ............... 370/236; 370/235; 370/328; 370/338; 455/68; 455/69

(58) Field of Classification Search ............ 370/338, 370/389, 394, 473, 236; 709/237; 455/67.11, 455/67.13, 69
See application file for complete search history.

(56) References Cited

U.S. PATENT DOCUMENTS 6,711,128 B1* 3/2004 Ramakrishnan ............. 370/230
2002/0025778 A1* 2/2002 Lee ......................... 455/3.05
2003/0135640 A1* 7/2003 Ho et al. ..................... 709/237
2005/0111416 A1* 5/2005 Ginzburg .................... 370/338
2005/0238054 A1* 10/2005 Sharma ...................... 370/473
2006/0018332 A1* 1/2006 Kakani et al. ............... 370/428
2006/0034174 A1* 2/2006 Nishibayashi et al. ....... 370/235
2006/0034247 A1* 2/2006 Gu et al. ..................... 370/349
2006/0048034 A1* 3/2006 Cho .......................... 714/749
2006/0107166 A1* 5/2006 Nanda ....................... 714/748

* cited by examiner

*Primary Examiner*—Aung S. Moe
*Assistant Examiner*—Feben M Haile
(74) *Attorney, Agent, or Firm*—Garlick Harrison & Markison; Shayne X. Short

(57) ABSTRACT

Aggregated fragment acknowledgement in a LAN. A transmitter sends a data packet to a receiver. The receiver then constructs an AFAF and sends that AFAF back to a transmitter. The transmitter is then able to determine the success and/or failure, in full or in part, of the transmission of the data packet to the receiver. A very precise granularity, or resolution, of the success of the transmission may be achieved on a per fragment basis. Bandwidth savings may also be achieved. When no resolution on a fragment basis is required, then that level of resolution is not employed. The resolution of the fragment basis may be adaptively employed when required to notify the transmitter of the status of one or more fragments within a data packet.

54 Claims, 18 Drawing Sheets

Wireless Local Area Network (WLAN) Communication System 100

WLAN Communication System 200 (One Possible Embodiment of WLAN Communication System 100)

Communication System 300

Communication System 305

WLAN Interactive Device 400

Aggregated Fragment Acknowledgement Frame (AFAF) 700

Frag. Info. (2 bit pair) Coding

00 - No ACK Status Available for Fragment
01 - ACK Status Positive (Fragment Acknowledged as Received)
10 - ACK Status Negative (Fragment Acknowledged as NOT Received)
11 - (Reserved)

Aggregated Fragment Acknowledgement Frame (AFAF) 900

Aggregated Fragment Acknowledgement Frame (AFAF) 1000

Aggregated Fragment Acknowledgement Frame (AFAF) 1100

WLAN Communication Method 1300

EACKFIELD Coding Method 1600

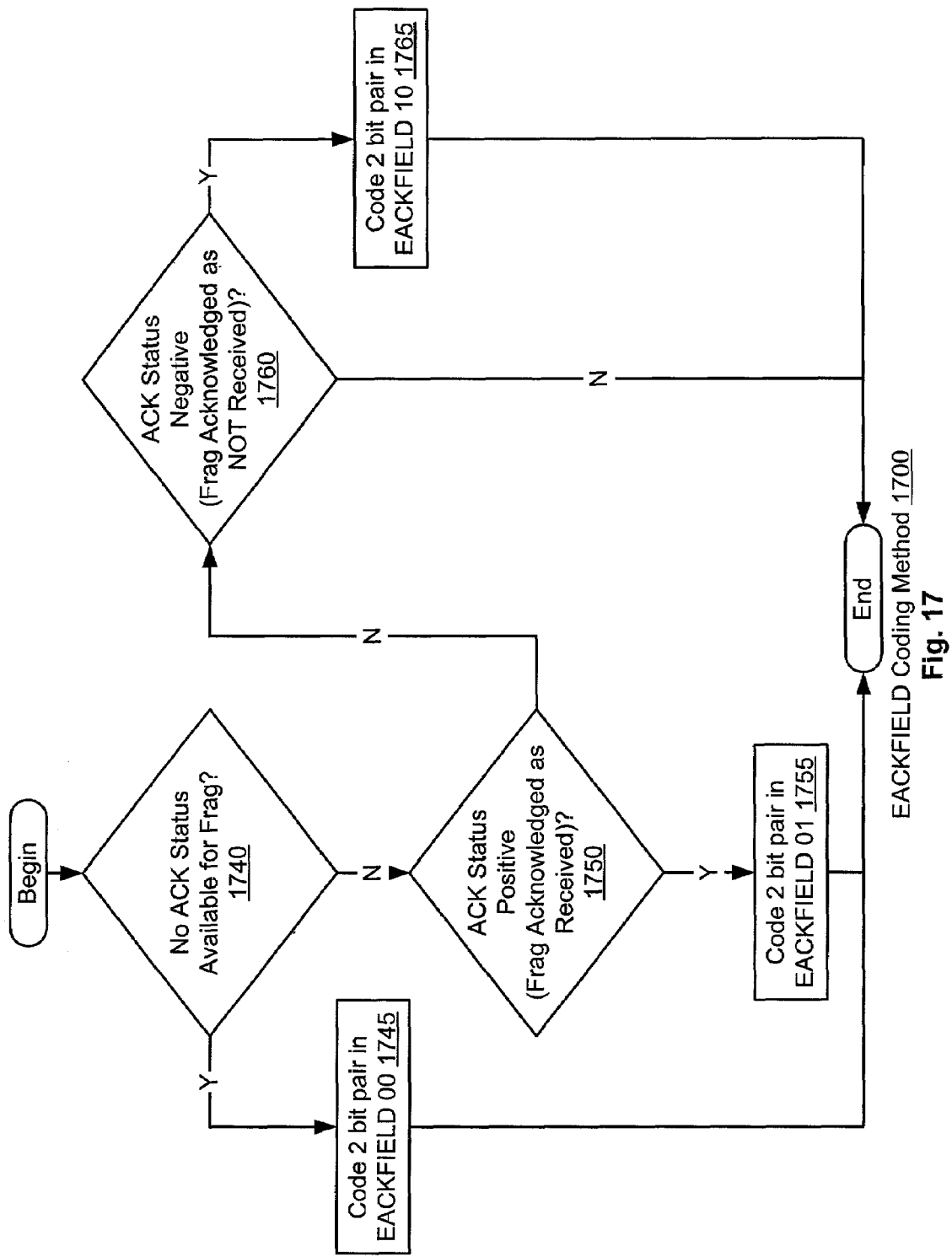
Fig. 17 EACKFIELD Coding Method 1700

AGGREGATED FRAGMENT ACKNOWLEDGEMENT IN LOCAL AREA NETWORK

CROSS REFERENCE TO RELATED PATENTS/PATENT APPLICATIONS

The present U.S. Utility Patent Application claims priority pursuant to 35 U.S.C. § 119(e) to U.S. Provisional Patent Application Ser. No. 60/381,542, entitled "AGGREGATED FRAGMENT ACKNOWLEDGEMENT IN A LOCAL AREA NETWORK,", filed May 17, 2002, pending, which is hereby incorporated herein by reference in its entirety and is made part of the present U.S. Patent Application for all purposes.

TECHNICAL FIELD OF THE INVENTION

The invention relates generally to communication systems; and, more particularly, it relates to communication systems that are implemented, at least in part, using a local area network.

BACKGROUND OF THE INVENTION

Data communication systems have been under continual development for many years. In some communication systems, local area networks (LANs) compose at least a part of the communication system. Some LANs are implemented using wireless LANs (WLANs). These WLANs exhibit some characteristics that can be problematic in data communications between various nodes within the WLAN. The communication medium, being wireless, is typically very unreliable when compared to wireline LAN networks. In an effort to combat these unreliability concerns, there is oftentimes an effort to send acknowledgement (ACK) frames back to a transmitter node from a receiver node. For example, a transmitter node sends a data packet to a receiver node, and then the receiver nodes send an ACK back to the transmitter node indicating the success or failure of the data packet's transmission. There has been much effort to try to develop a method of performing this ACK functionality successfully and efficiently.

The prior art approaches to provide this functionality have several deficiencies. One of the deficiencies in the prior art is that when a frame is fragmented into smaller frames to reduce the probability of an error-induced frame loss, an acknowledgement is required to be returned for each of the individual fragments. The ACK frame transmissions, while necessary to insure that fragment deliveries have been successful, add overhead to the network, thereby reducing the overall throughput that can be achieved. Some prior art improves on this situation by providing for a single ACK to be sent in response to a sequence of fragment transmissions. The deficiency in this prior art lies in the prior art's inability to provide a sufficient degree of resolution of the fragmented data components that have undergone an attempted transmission. The prior art approaches are capable to deal only with the entire data packet composed of the multiple fragments. When there is a problem with any one of the fragments, then the entire data packet, comprising the full set of fragments, is then re-sent from the transmitter to the receiver. This can result in a very inefficient use of the total throughput capabilities of the LAN, in that, many data components (fragments in this instance) may need to be re-sent after they have already been successfully sent in the first place.

Further limitations and disadvantages of conventional and traditional systems will become apparent through comparison of such systems with the invention as set forth in the remainder of the present application with reference to the drawings.

SUMMARY OF THE INVENTION

Various aspects of the invention can be found in a communication system that is operable to employ an aggregated fragment acknowledgement frame (AFAF). A transmitter sends a data packet to a receiver. The receiver then constructs an AFAF and sends the AFAF back to a transmitter. The transmitter is then able to determine the success and/or failure, in full or in part, of the transmission of the data packet to the receiver based on the AFAF. The present invention allows for a granularity, or resolution, of the success of the transmission on a per fragment basis. The present invention is also operable to provide for bandwidth savings, in that, when no resolution on a fragment basis is required, then that level of resolution is not employed. The resolution of the fragment basis may be adaptively employed when required to notify the transmitter of the status of one or more fragments within a data packet.

The present invention may employ the AFAF in a communication system offering one or more WLANs. It is also noted, however, that the present invention is also adaptable and operable within wireline LANs as well, or LANs employing portions that are wireless and portions that are wireline. Wireline is intended to include fiber-optic implemented communication systems as well.

The present invention provides for a medium access control (MAC) layer acknowledgement (ACK) that allows for individual acknowledgement of each fragment as well as allowing for acknowledgement of those frames which are not fragments, bandwidth savings may be achieved when distinguishing between and selectively performing the two types of ACKs. An AFAF is generated that is appropriate to the particular instance thereby providing all of the necessary information and also ensuring bandwidth conservation when a higher degree of resolution is not required.

The invention provides for a more effective may to deliver aggregated acknowledgement information (using AFAFs), allowing for minimizing the size of the ACK frame and also for delivering precise information. The invention includes the ability to send a MAC frame that individually acknowledges fragments, or an entire set of fragments, or for unfragmented packets, concurrently. It includes the ability to send positive acknowledgements as well as negative acknowledgements and it allows for an indication of a lack of information regarding the status of delivery of any given packet, so that potentially erroneous implicit assumptions will not be made on the part of the AFAF recipient.

The AFAF may include information concerning an entire packet (when that data packet is not sent as a packet and has not been fragmented) or one or more fragments (when that data packet is sent as a packet and has been fragmented at least to some degree). The AFAF is able to include information concerning the success and/or failure of each of the components, either on a packet basis and/or on a per fragment basis and/or on a group of fragment basis.

A portion of the AFAF may be repeated to accommodate the status of more than one number of data streams. This will allow the ACK status for a number of frames to be represented within a signal AFAF.

In addition, other aspects, advantages and novel features of the invention will become apparent from the following detailed description of the invention when considered in conjunction with the accompanying drawings.

BRIEF DESCRIPTION OF THE DRAWINGS

A better understanding of the invention can be obtained when the following detailed description of various exemplary embodiments is considered in conjunction with the following drawings.

FIG. 17 is a flow diagram illustrating another embodiment of an EACKFIELD coding method that is performed according to the invention.

DETAILED DESCRIPTION OF A PREFERRED EMBODIMENT

Figure 1:
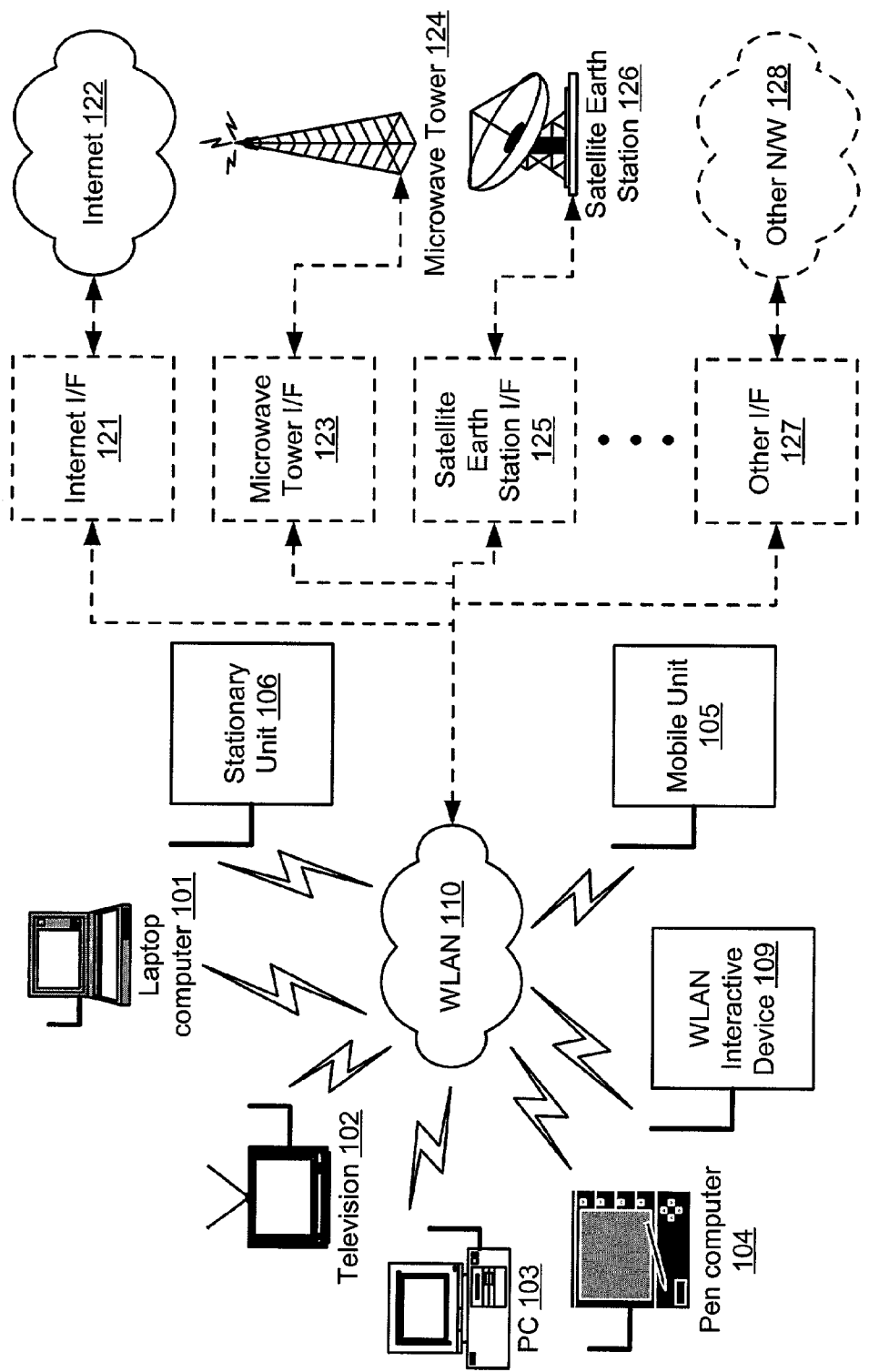
FIG. 1 is a system diagram illustrating an embodiment of a WLAN communication system that is built according to the invention.

In a LAN, data frames are transmitted from one LAN node to another LAN node over a shared medium that has a finite probability of frame error. In LANs with a relatively high probability of frame error, a throughput gain can be realized by including allowance for an ACK frame transfer between those nodes as part of the MAC protocol defined for the LAN. WLANs include one type of LAN that may include a relatively higher probability of frame error when compared to wireline based LANs. The communication of MAC ACK frames will typically create additional overhead at the MAC layer that will reduce the overall throughput for the LAN. Because the MAC layer ACK frames reduce the requirement for higher-layer ACK packets, an overall throughput improvement will then be seen at the higher layer. This improvement in throughput occurs because the higher layer acknowledgement method typically requires much longer delays in order to retransmit a frame when the corresponding higher layer ACK packet is not returned as is normally expected, and during the long delay, additional packets are not transmitted.

Typical MAC layer acknowledgement methods include a positive acknowledgement frame delivered immediately in response to the receipt of each and every data-bearing frame, or data packet. A more advanced method for MAC acknowledgement allows for aggregation of acknowledgements for many individual MAC frames into a single multi-ACK frame. Such aggregation further improves the throughput of the system by reducing the overhead of the MAC acknowledgement portion of the MAC protocol. The aggregation of acknowledgements also allows for the transfer of negative acknowledgement information for those frames which were not properly received, but whose attempted delivery can be inferred at the receiver by virtue of gaps in the pattern of frames that were received properly. Such gaps are typically identified through some form of sequence numbering within the MAC frames.

In addition, some MAC protocols include fragmenting of larger upper layer packets. In such instance, these MAC protocols include a fragmentation and re-assembly of larger upper layer packets in order to improve delivery probability, where delivery probability can be related directly to the duration of transmission of a single MAC frame. By fragmenting a packet into multiple smaller frames, the probability of delivery of each fragment increases over the probability of delivery for the original larger packet, while some portion of the data will statistically require retransmission due to error. The overall effect is still a great increase in throughput. However, each of the fragments now requires a dedicated MAC layer acknowledgement frame. This can result in some overall network inefficiencies.

The present invention provides for the ACK for an entire set of fragments can be aggregated into a single ACK, and this ACK in turn may be aggregated with the ACK frames for other packets in the multi-ACK frame. This will greatly reduce the overhead of the ACK portion of the MAC protocol. However, this solution is not fully optimal. If the ACK for each of the fragments is aggregated into a single ACK for the entire set of fragments, then the advantage of having fragmented the packet is effectively lost. If any of the fragments for a single packet is missing, then a positive ACK cannot be returned for that particular packet, and the entire set of fragments for the packet must be retransmitted at the MAC layer, when in fact, only one or two of the fragments may have needed retransmission. This may result in a resending of a large amount of data that have been transmitted and received without any error at all.

The present invention provides for a MAC layer acknowledgement that allows for individual acknowledgement of each fragment as well as allowing for acknowledgement of those frames which are not fragments. Bandwidth savings may be achieved when distinguishing between and selectively performing the two types of ACKs. An AFAF is generated that is appropriate to the particular instance thereby providing all of the necessary information and also ensuring bandwidth conservation when a higher degree of resolution is not required. The present invention will provide for many benefits including greater specificity of the success/failure of each of the fragments, reduced bandwidth requirements, and/ or overall communication system efficiency.

The present invention may be implemented in a variety of contexts. While the present invention is applicable within the context of any number of LANs, a WLAN is one embodiment that may benefit significantly from the present invention given its relatively high finite probability of frame error when compared to the relatively lower frame error probability wireline LANs.

FIG. 1 is a system diagram illustrating an embodiment of a WLAN communication system 100 that is built according to the invention. The WLAN communication system 100 includes a number of devices that are all operable to communicate with one another via WLAN 110. For example, a number of devices that each include the functionality to interface with the LAN 110 may include a laptop computer 101, a television 102, a personal computer (PC) 103, a pen computer 104 (that may be viewed as being a personal digital assistant (PDA), a personal electronic planner, or similar device), a mobile unit 105 (that may be viewed as being a telephone, a pager, or some other mobile WLAN operable device), and/or a stationary unit 106 (that may be viewed as a device that typically resides in a single location).

The group of devices that may interact with the WLAN 110 is not intended to be an exhaustive list of device that may interact with a WLAN, and a generic device shown as a WLAN interactive device 109 represents a generic device that includes the functionality in order to interactive with the WLAN 110 and/or the other devices within the WLAN 110. Any of the devices 101-106 may be viewed generically as being the WLAN interactive device 109 without departing from the scope and spirit of the invention. Each of the devices 101-106 and the WLAN interactive device 109 may be viewed as being nodes of the WLAN 110.

Any of the devices described above within the FIG. 1 may include the functionality provided by the present invention to support the AFAF functionality thereby providing efficiencies and improvements in the reliability and/or bandwidth of communication between the various devices within the WLAN 110.

It is also noted that the WLAN 110 itself includes functionality to allow interfacing with other networks as well. For example, the WLAN 110 may include an Internet interface 121 that allows for interfacing to the Internet 122. This Internet interface 121 may be viewed as being a base station device for the WLAN 110 that allows any one of the WLAN interactive devices to access the Internet 122.

It is also noted that the WLAN 110 may also include functionality to allow interfacing with other networks besides the Internet 122. For example, the WLAN 110 may include an microwave tower interface 123 that allows for interfacing to a microwave tower 124 thereby allowing communication with one or more microwave networks. Similar to the Internet interface 121, the microwave tower interface 123 may be viewed as being a base station device for the WLAN 110 that allows any one of the WLAN interactive devices to access the one or more microwave networks via the microwave tower 124.

Similarly, the WLAN 110 may include a satellite earth station interface 125 that allows for interfacing to a satellite earth station 126 thereby allowing communication with one or more satellite networks. The satellite earth station interface 125 may be viewed as being a base station device for the WLAN 110 that allows any one of the WLAN interactive devices to access the one or more satellite networks via the satellite earth station interface 125.

This finite listing of various network types that may interface to the WLAN 110 is not intended to be exhaustive. For example, any other network 128 may communicatively couple to the WLAN 110 via an interface 127 that includes the functionality for any one of the WLAN interactive devices to access the other network 128.

Figure 2:
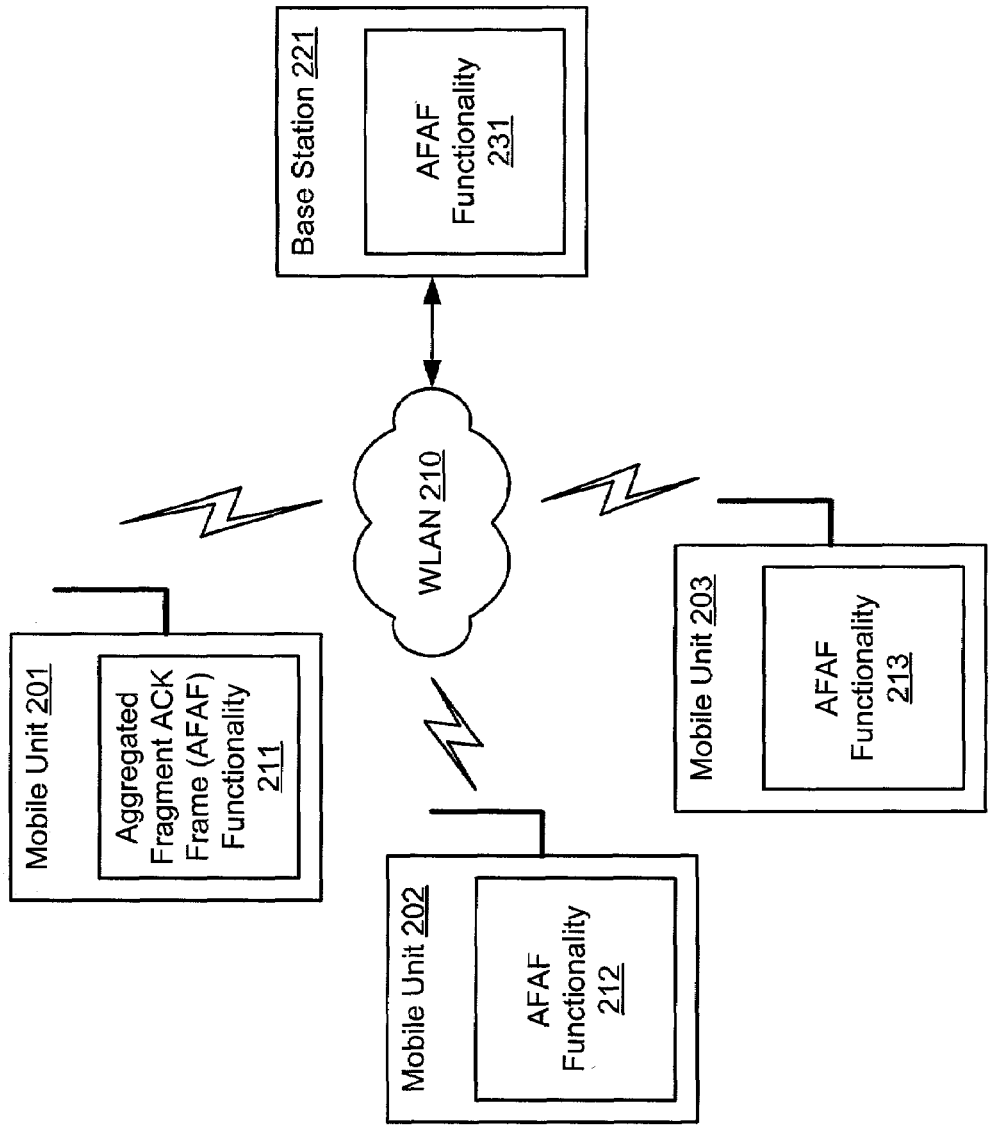
FIG. 2 is a system diagram illustrating another embodiment of a WLAN communication system that is built according to the invention.

FIG. 2 is a system diagram illustrating another embodiment of a WLAN communication system 200 that is built according to the invention. A number of mobile units 201, 202, and 203 are each operable to communicate with one another via a WLAN 210 using wireless communication. In addition, a base station 221 is operable to support communication with any of the mobile units 201, 202, and/or 203 with any other network that is able to communicate with the WLAN 210. The base station 221 may be viewed as a device or functionality that allows for interfacing with any one of the devices that communicates to the WLAN 210 to an external network or device. Each of the mobile units 201, 202, and/or 203 and the base station 221 may be viewed as being nodes of the WLAN 210.

Each of the mobile units 201, 202, and/or 203 and the base station 221 is operable to support AFAF functionality that is performed according to the invention. For example, the mobile unit 201 is operable to support AFAF functionality 211; the mobile unit 202 is operable to support AFAF functionality 212; the mobile unit 203 is operable to support AFAF functionality 213; and the base station 221 is operable to support AFAF functionality 231.

The ability for each of the mobile units 201, 202, and 203 and the base station 221 and the base station to support AFAF functionality, in communicating with each other, will provide for much improved efficiency, performance and/or reliability of the WLAN communication system 200. The FIG. 2 shows an embodiment where each of the devices that communicatively couples to a WLAN is able to support AFAF functionality in accordance with the present invention.

Figure 3A:
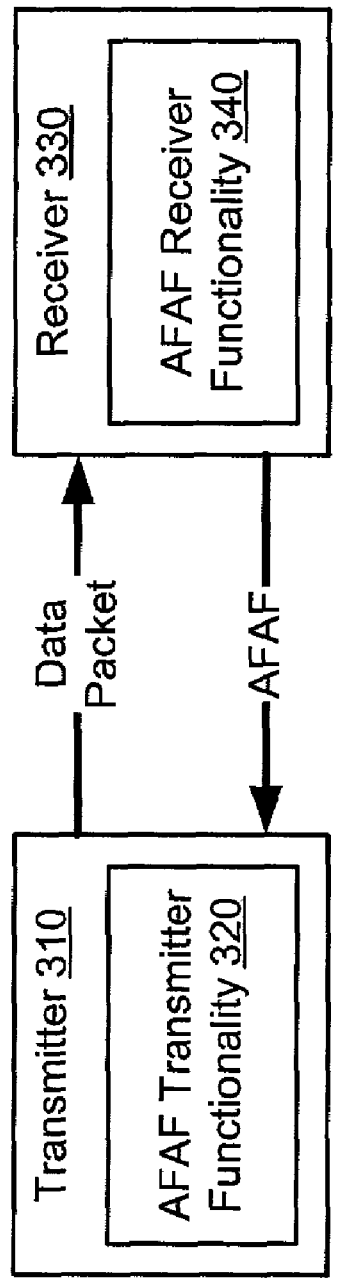
FIG. 3A is a system diagram illustrating an embodiment of a communication system that is built according to the invention.

FIG. 3A is a system diagram illustrating an embodiment of a communication system 300 that is built according to the invention. A transmitter 310 is operable to transmit a data packet to a receiver 330. The receiver 330 is operable to support AFAF receiver functionality 340 that is able to generate an AFAF that is then transmitted back from the receiver 330 to the transmitter 310. The transmitter 310 is then able to receive and decode the received AFAF using AFAF transmitter functionality 320.

The FIG. 3A shows an embodiment where the functionality of employing an AFAF, to provide the many benefits and advantages provided by the present invention, may be performed in the context of a transmitter and receiver within a communication system. The communication system 300 is a LAN in certain embodiments; alternatively, the communication system 300 may be a WLAN in others. Again, the present invention is also adaptable to wireline based LANs as well. Those networks suffering degraded performance because of relatively high probability of frame error between nodes will benefit greatly from the implementation of the present invention.

Figure 3B:
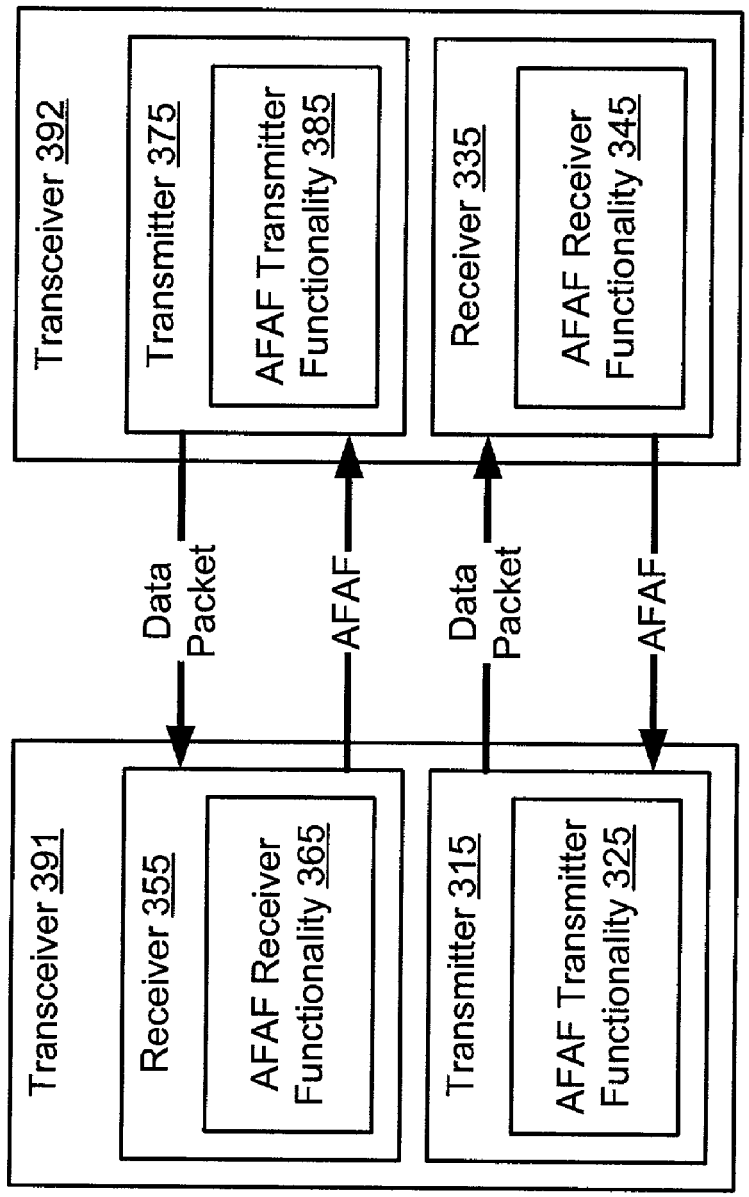
FIG. 3B is a system diagram illustrating another embodiment of a communication system that is built according to the invention.

FIG. 3B is a system diagram illustrating another embodiment of a communication system 305 that is built according to the invention. Two transceivers, shown as a transceiver 391 and a transceiver 392, are operable to perform communication between one another. For example, the transceiver 391 is able to transmit a data packet to the transceiver 392, and vice versa. The functionality within the transceiver 391 and the transceiver 392 may be viewed as each including a transmitter and a receiver, or the functionality thereof. For example, the transceiver 391 includes a receiver 355 and a transmitter 315; the transceiver 392 includes a receiver 375 and a transmitter 335. The transmitter 375 is operable to communicate to the receiver 355. The transmitter 315 is operable to communicate to the receiver 335. The transmitter 375 is operable to transmit a data packet to the receiver 355. The receiver 355 is operable to support AFAF receiver functionality 365 that is able to generate an AFAF that is then transmitted back from the receiver 355 to the transmitter 375. Similarly, the transmitter 315 is operable to transmit a data packet to the receiver 335. The receiver 335 is operable to support AFAF receiver functionality 345 that is able to generate an AFAF that is then transmitted back from the receiver 335 to the transmitter 315.

The FIG. 3B shows an embodiment where the functionality of employing an AFAF, to provide the many benefits and advantages provided by the present invention, may be performed in the context of two transceivers within a communication system. The communication system 305 is a LAN in certain embodiments; alternatively, the communication system 305 may be a WLAN in others. Again, the present invention is also adaptable to wireline based LANs as well. Those networks suffering degraded performance because of relatively high probability of frame error between nodes will benefit greatly from the implementation of the present invention.

Figure 4:
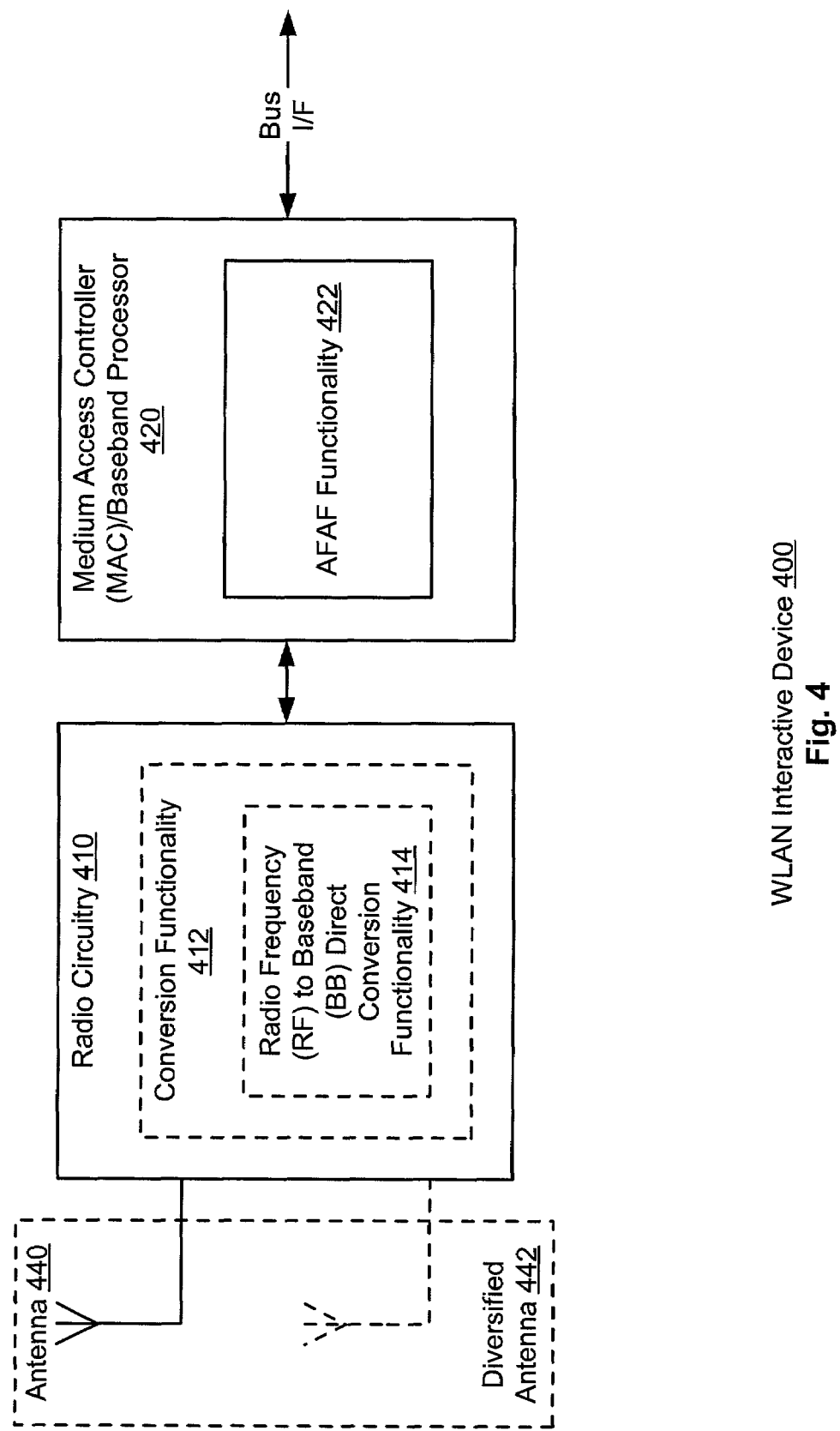
FIG. 4 is a device diagram illustrating an embodiment of a WLAN interactive device that is built according to the invention.

FIG. 4 is a device diagram illustrating an embodiment of a WLAN interactive device 400 that is built according to the invention. The WLAN interactive device 400 includes a radio circuitry 410 and a medium access controller (MAC)/baseband processor 420; the MAC functionality may be viewed as being designed into the baseband processor. The radio circuitry 410 is operable to receive a wireless signal via an antenna 440. The antenna 440 may be part of a diversified antenna 442 that includes one or more antennae. The MAC/baseband processor 420 is operable to communicate with other devices via a bus interface.

Both the circuitry 410 and a MAC/baseband processor 420 are Institute of Electrical and Electronic Engineers (IEEE) 802.11b-compliant chipsets that may be implemented in a digital composite metal oxide semiconductor (CMOS) process. This implementation involves one of the lowest possible silicon cost approaches to wireless radio and enables new product price points via chipset integration. The circuitry 410 and a MAC/baseband processor 420 are also compliant within a proposed draft of the 802.11e standard.

It is noted that the compatibility of the 802.11b functionality is backward compatible and forward compatible with the previous and subsequent versions of 802.11. As an example, 802.11e is a draft proposal for a next generation of the 802.11 standard; the functionality of the proposed 802.11e standard will compatible with the proposed drafts of 802.11e. The 802.11e draft may be viewed as supporting QoS (quality of service) enhanced 802.11 MAC functionality. The functionality of this embodiment of the invention, as described herein as being operable to support 802.11b, may be employed to provide for even greater performance within the 802.11e draft that capitalizes on the benefits of the invention described herein.

In certain embodiments, the MAC/baseband processor 420 involves a direct-conversion radio architecture that is shown in a functional block that is able to support conversion functionality 412 to transform from a radio frequency (RF) signal received by the antenna to a baseband (BB) frequency for use in the MAC/baseband processor 420. If desired, this conversion functionality 412 may include radio frequency (RF) to baseband (BB) direct conversion functionality 414. Alternatively, the direct conversion functionality 412 includes the functionality that may be operable to perform the conversion using an intermediate frequency (IF) to transform from the RF to BB. The direct conversion functionality 412 may be used to provide many benefits. This direct conversion functionality 412 is able to minimize a number of design considerations including cost, the number of components and footprint while improving product reliability and manufacturability. The design of the MAC/baseband processor 420 may be optimized to significantly out-perform existing solutions in the hostile multi-path signal environments often found in the enterprise and home applications.

The MAC designed into the baseband processor provides hardware-based security that meets customer needs across all market segments. In one embodiment, the baseband processor employs the 40-bit encryption specified by the IEEE 802.11 Wired Equivalent Privacy (WEP) standard. In certain embodiments, the MAC/baseband processor 420 includes hardware support of the 128-bit extension of WEP, 802.1x, Temporal Key Initiation Protocol (TKIP) as well as the Advanced Encryption Standard (AES) protocol planned for the forthcoming IEEE security specification (IEEE 802.11 TGi). Hardware support of encryption/decryption improves performance and significantly lowers host-CPU utilization in both client and access device configurations.

As mentioned above, the radio circuitry 410 may be implemented to support the RF to BB direct conversion functionality 414. The radio circuitry 410 may be viewed as being a direct-conversion CMOS integrated circuitry (IC). This single-chip radio combines with the MAC/baseband processor 420 to deliver a complete IEEE 802.11 solution. The MAC/baseband processor 420 may be viewed as being a Wi-Fi baseband processor that is operable to support combined wireless LAN baseband processor and MAC functionality. If desired, the MAC/baseband processor 420 may be implemented to include simultaneous V.92 modem functionality and 10/100, or alternatively 10/100/1G, Ethernet functionality.

The MAC/baseband processor 420 is operable to support AFAF functionality 422 according to the invention. The FIG. 4 shows yet another embodiment of a device that may be implemented to support the AFAF functionality according to the invention.

Figure 5:
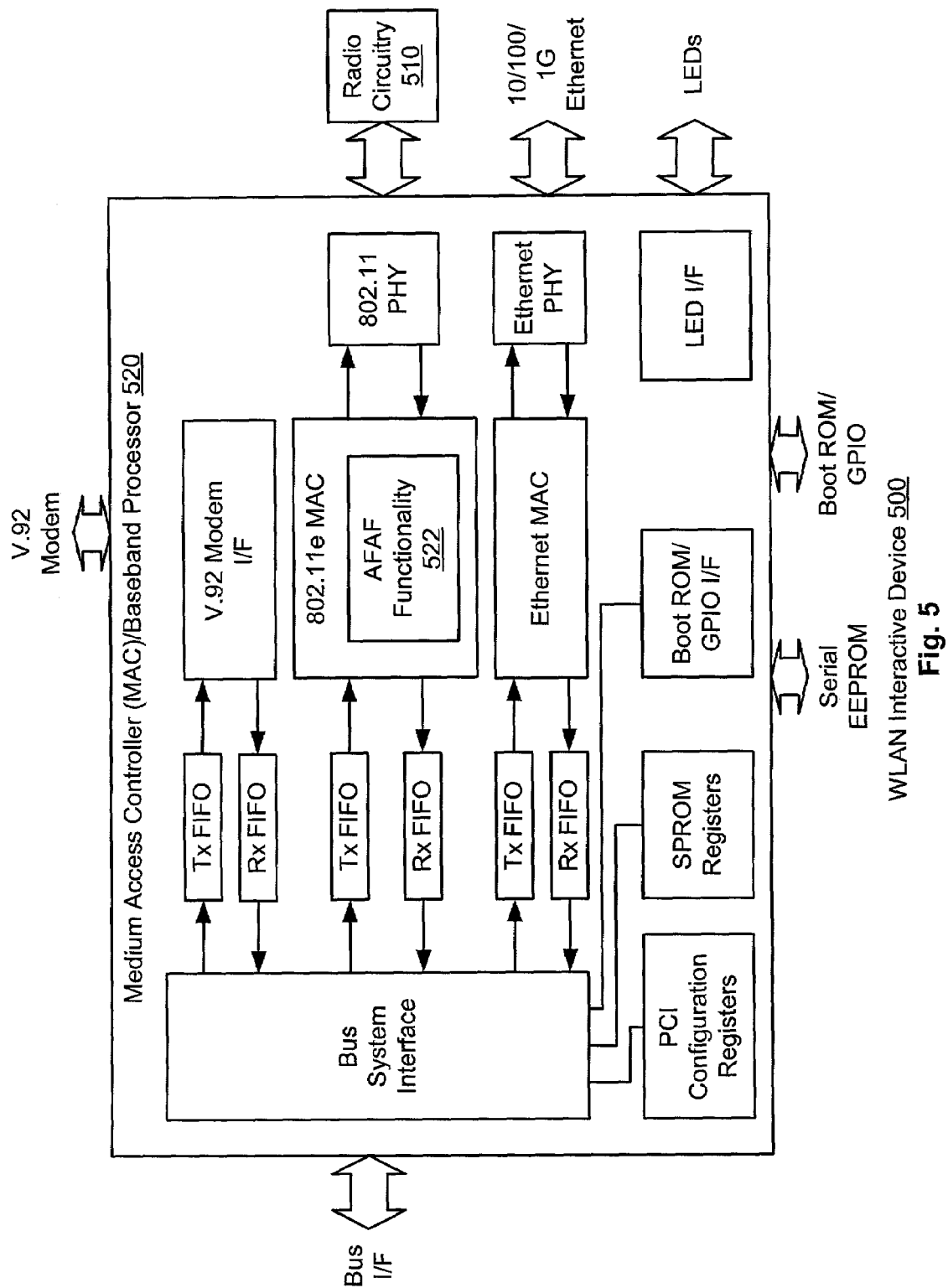
FIG. 5 is a device diagram illustrating another embodiment of a WLAN interactive device that is built according to the invention.

FIG. 5 is a device diagram illustrating another embodiment of a WLAN interactive device 500 that is built according to the invention. The WLAN interactive device 500 includes a radio circuitry 510 and a MAC/baseband processor 520; the MAC functionality may be viewed as being designed into the baseband processor. The radio circuitry 510 is operable to receive a wireless signal via an antenna. Similar to the embodiment of the FIG. 4, the antenna may be part of a diversified antenna that includes one or more antennae. The MAC/baseband processor 520 is operable to communicate with other devices via a bus interface.

The MAC/baseband processor 520 integrates the IEEE 802.11 MAC, 10/100 (or alternatively 10/100/1G) Ethernet MAC, and V.92 software modem interfaces thereby enabling complete portable Internet communications connectivity. The IEEE 802.11 MAC may be implemented to include the new proposed draft of the IEEE 802.11e and the functionality of the invention described herein. Specifically, this modified and improved 802.11 MAC, shown as the 802.11e MAC within the MAC/baseband processor 520, includes AFAF functionality 522 according to the invention. The AFAF functionality 522 will provide improvements for wireless communication of the WLAN interactive device 500.

The integration of the various functionality of the MAC/baseband processor 520 provides a solution able to lower the cost per unit function and allows virtually ubiquitous high-speed connectivity to the Internet, proprietary networks, and/or corporate networks through either wired or wireless connectivity. Laptop computer manufacturers are provided with a two-chip solution, using the radio circuitry 510 and the MAC/baseband processor 520, that meets a number of connectivity requirements. Wireless 802.11 connectivity may be achieved where WLANs are available, and modem and Ethernet functionality are also provided within a compact solution.

In certain embodiments, the MAC/baseband processor 520 is operable to support IEEE 802.11 MAC and baseband functions and interfaces to the radio circuitry 510 to provide WLAN connectivity supporting data rates from 1 Mbps to 11 Mbps. Then the MAC/baseband processor 520 is implemented to support direct conversion functionality (from RF to BB), the additional external components typically required for 802.11 applications may be virtually eliminated. This will result in significant cost, power, and footprint savings. If desired, other industry standardized WEP, WEP2, and AES encryption coupled with IEEE 802.1x support may be provided to ensure greater security of transmitted data.

In addition, in certain embodiments, the MAC/baseband processor 520 is operable to support Ethernet functionality. This Ethernet functionality may include 10/100 Ethernet functionality, or alternatively 10/100/1G Ethernet functionality. The Ethernet functionality includes a complete IEEE 802.3u-compliant MAC that may also be designed to implement management functions, including RMON, Ethernet-like MIB, and IEEE 802.3u Ethernet MIB.

Moreover, in certain embodiments, the MAC/baseband processor 520 is operable to support a V.92 data/fax/voice modem interface to an external serial modem codec/DAA thereby providing a complete, low cost V.92 data/fax/voice soft modem. A V.92 data/fax/voice soft modem driver may be designed to support a number of operating systems including Microsoft Windows 98, Microsoft Windows ME, and Microsoft Windows 2000 and/or virtually any other operating system.

Figure 6:
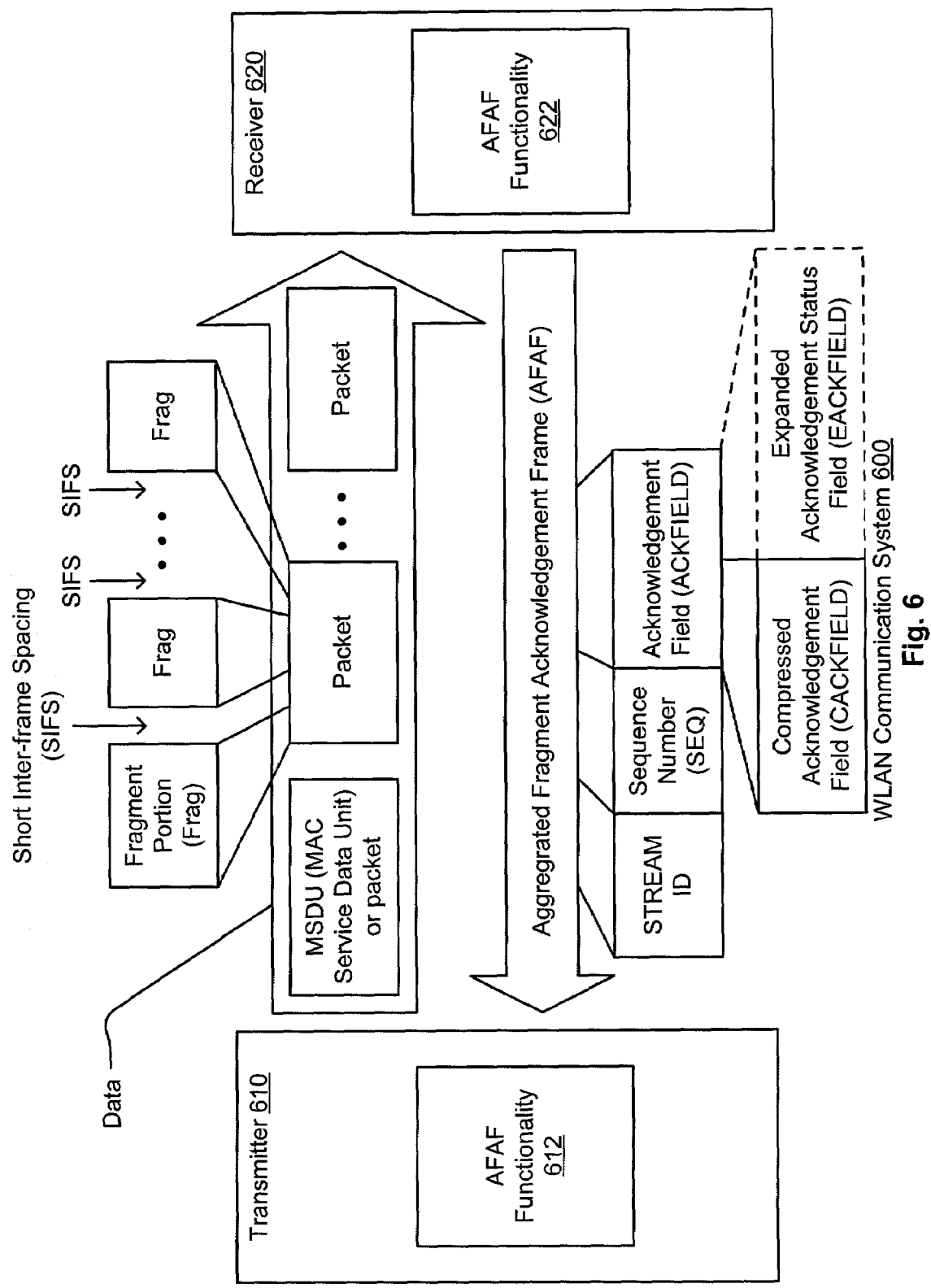
FIG. 6 is a system diagram illustrating another embodiment of a WLAN communication system that is built according to the invention.

FIG. 6 is a system diagram illustrating another embodiment of a WLAN communication system 600 that is built according to the invention. The WLAN communication system 600 includes a transmitter 610 that is operable to transmit data to a receiver 620. Each of the transmitter 610 and the receiver 620 is operable to support AFAF functionality according to the invention. For example, the transmitter 610 is operable to support AFAF functionality 612; the receiver 620 is operable to support AFAF functionality 622.

The data may be partitioned into a number of data packets. These data packets may be referred to as MAC service data units (MSDUs or packets). Sometimes, a packet may be partitioned into two or more fragment portions. After the receiver 620 receives the data, it employs the AFAF functionality 622 to construct an AFAF and then sends the AFAF back to the transmitter 610. The transmitter, using the AFAF functionality 612, is then able to determine the success and/or failure, in full or in part, of the transmission of the data to the receiver 620 based on the AFAF.

The AFAF includes, among other things, a stream identifier (stream ID), a sequence number (SEQ), and an acknowledgement field (ACKFIELD). The stream ID is able to assist in the unique indication of which stream of packets is receiving acknowledgement information. The stream of packets is transmitted by the MAC device with the MAC address corresponding to the destination address of the AFAF.

The SEQ contains the sequence number that uniquely identifies a packet in the stream of packets uniquely identified by the combination of the destination MAC address, source MAC address and stream ID field.

The ACKFIELD contains acknowledgement status for packets, or alternatively for individual fragments of a packet. The ACKFIELD is coded to allow both representations to be interspersed. The first acknowledgement status appearing in the ACKFIELD pertains to the packet with sequence number corresponding to SEQ (from the SEQ field). The next acknowledgement status in the ACKFIELD pertains to the packet with sequence number corresponding to seq+1, and so forth. The ACKFIELD is nominally limited in size to a predetermined length M. The ACKFIELD may be larger than this size, as will be explained in the following section. The first bits are the compressed acknowledgement status field (CACKFIELD), comprising the full extent of the nominal length of the ACKFIELD. Any additional length to the field comprises an expanded acknowledgement status field (EACKFIELD) as will be described in greater detail in other embodiments. The presence of the EACKFIELD is dependent upon the values found in the CACKFIELD. It is understood that the EACKFIELD is not always present.

The present invention includes a manner to construct and deliver aggregated acknowledgement information, allowing for minimizing the size of the ACK frame and for delivering precise information. The present invention also includes the ability to send a MAC frame which individually acknowledges fragments, or an entire set of fragments, or for unfragmented packet; this may be viewed as being an AFAF according to the invention. The present invention also includes the ability to send positive acknowledgements as well as negative acknowledgements, and it allows for an indication of lack of information regarding the status of delivery of any given packet.

In a typical LAN, a stream of packets from a higher layer may be sent from one LAN node to another LAN node, where a stream is a set of packets that correspond to some singularly identifiable higher layer activity. These two LAN nodes may be viewed as the transmitter 610 and the receiver 620. A given stream of packets is sent in one direction, for example, from a stream source LAN node with MAC address add_s to a stream destination LAN node with MAC address add_d. Each stream of packets may include a stream that can be included in the MAC frame that is created when the higher layer packet is transferred from the higher layer to the MAC for delivery to the other LAN node and converted to the MAC frame format. The stream identifier (stream ID), combined with the two MAC addresses uniquely identifies a stream within the LAN context for all nodes present on the LAN. The combination of stream ID, source MAC address and destination MAC address uniquely identifies a stream.

In addition to the stream ID, each MAC frame can be made to contain a sequence number (SEQ), where the SEQ is unique only within the context of the stream. Different streams on the same LAN may share sequence number spaces without conflict, because the streams are uniquely identifiable. The first packet transmitted within a unique stream is assigned an arbitrary sequence number—each succeeding packet in that stream is assigned the next number in sequence.

In the conversion from higher layer packet to MAC frame, the higher layer packet may be fragmented by the MAC (into the fragment portions). If the packet is fragmented, then each of the MAC fragment frames contains the same stream identifier as the other fragments created from that single packet, and each of the MAC fragment frames contains the same stream source address and stream destination address as well as the same sequence number. A separate fragment number indication within each MAC fragment frame uniquely identifies the individual fragments of a given packet. Fragment information is not unique to a packet. Independently received fragmented frames are identified as belonging to a single packet within a stream through their common sequence number. Reassembly of the set of fragments for any given packet is facilitated through the use of the fragment numbers.

For each frame that is received by the MAC layer, an acknowledgement is usually desired. It is also noted that some streams may choose to forgo acknowledgements due to latency concerns or due to the nature of the data being transported in the stream. The MAC layer may also desire to indicate, through a negative acknowledgement, the lack of receipt of an expected frame. For those cases where an acknowledgement is desired, an AFAF provides an excellent tradeoff between latency, selectivity and throughput.

Figure 7:
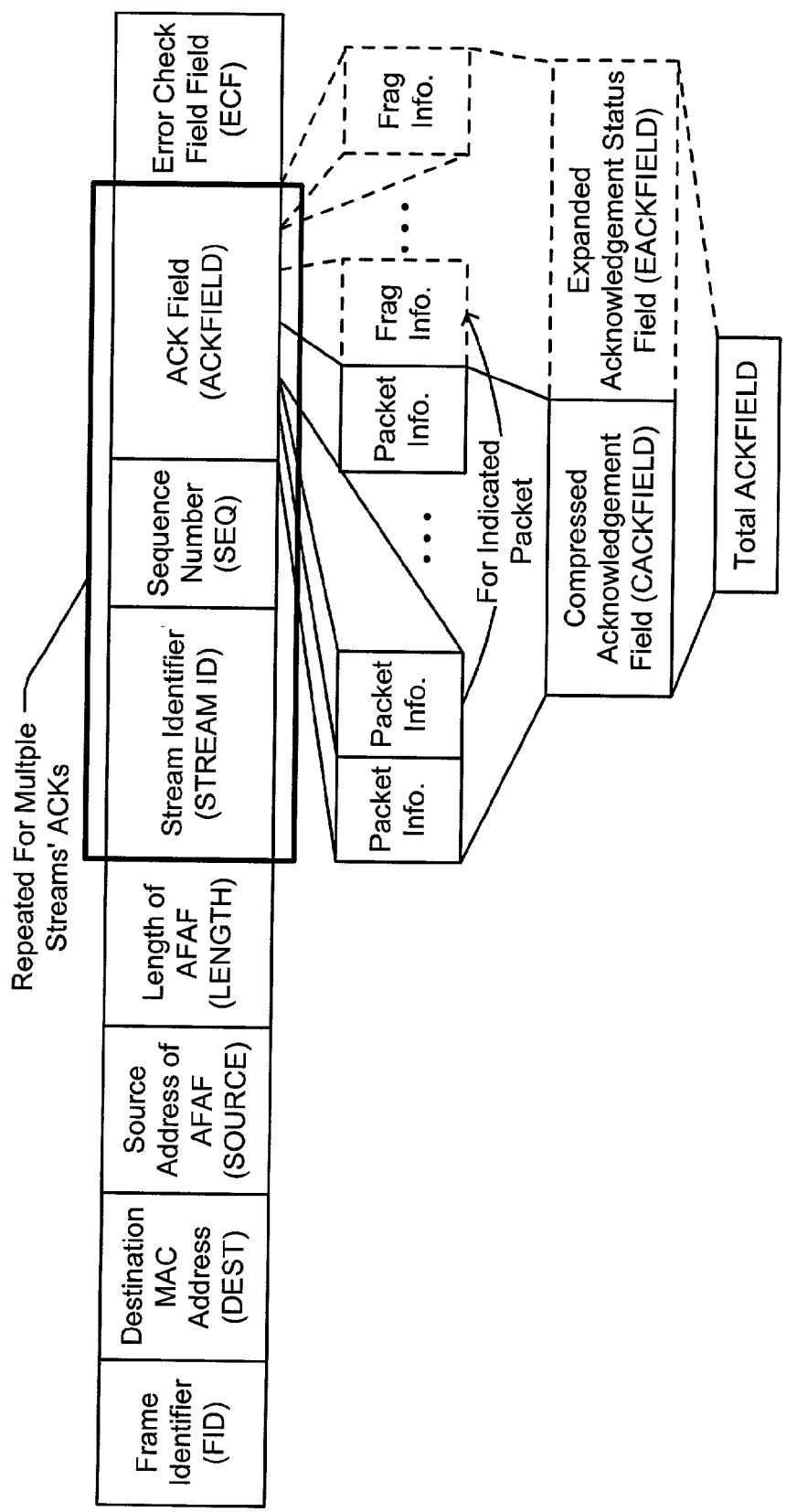
FIG. 7 is a diagram illustrating an embodiment of an AFAF that is arranged according to the invention.

FIG. 7 is a diagram illustrating an embodiment of an AFAF 700 that is arranged according to the invention. The stream ID, SEQ, and ACKFIELD may be repeated so that multiple streams' acknowledgements can be aggregated within a single AFAF and so that ACK status for frames covering a large sequence number space within a single stream ID can be represented within a single frame. The AFAF 700 includes a number of elements that are described below. The AFAF includes a frame identifier (FID), a destination MAC address (DEST), a source address of AFAF (SOURCE), length of AFAF (LENGTH), a stream ID, a SEQ, an ACKFIELD (that will include a CACKFIELD and sometimes include a EACKFIELD), and an error check field (ECF).

The FID indicates that the frame is in fact an AFAF. The DEST contains the destination MAC address of the AFAF (this address corresponds to the source of the stream of packets which is being acknowledged, addr_s in one of the embodiments described above). The SOURCE contains the source MAC address of the AFAF (this address corresponds to the destination of the stream of packets which is being acknowledged, addr_d in one of the embodiments described above). The LENGTH contains the length of the AFAF. The stream ID contains the stream identifier that, together with the destination MAC address and source MAC address, uniquely indicates which stream of packets is receiving acknowledgement information. This includes the stream of packets transmitted by the MAC device with MAC address corresponding to the destination address of the AFAF. The SEQ contains the sequence number that uniquely identifies a packet in the stream of packets uniquely identified by the combination of the destination MAC address, source MAC address and stream ID field.

The ACKFIELD contains acknowledgement status for packets, or alternatively for individual fragments of a packet. The ACKFIELD is coded to allow both representations to be interspersed. The first acknowledgement status appearing in the ACKFIELD pertains to the packet with sequence number corresponding to SEQ. The next acknowledgement status in the ACKFIELD pertains to the packet with sequence number corresponding to seq+1, and so forth. The ACKFIELD is nominally limited in size to a predetermined length M. The length M is 16bits in certain embodiments. The ACKFIELD may be larger than this size. The first M bits are the compressed ACK status, comprising the full extent of the nominal length of the ACKFIELD. Any additional length to the field comprises an EACKFIELD. The presence of the EACKFIELD is dependent upon the values found in the CACKFIELD. The CACKFIELD and the EACKFIELD comprise the total ACKFIELD.

The CACKFIELD is operable to convey packet information and the EACKFIELD, when necessary, to convey fragment information. The fragment information within the EACKFIELD corresponds to the indicated packets within the CACKFIELD.

Figure 8:
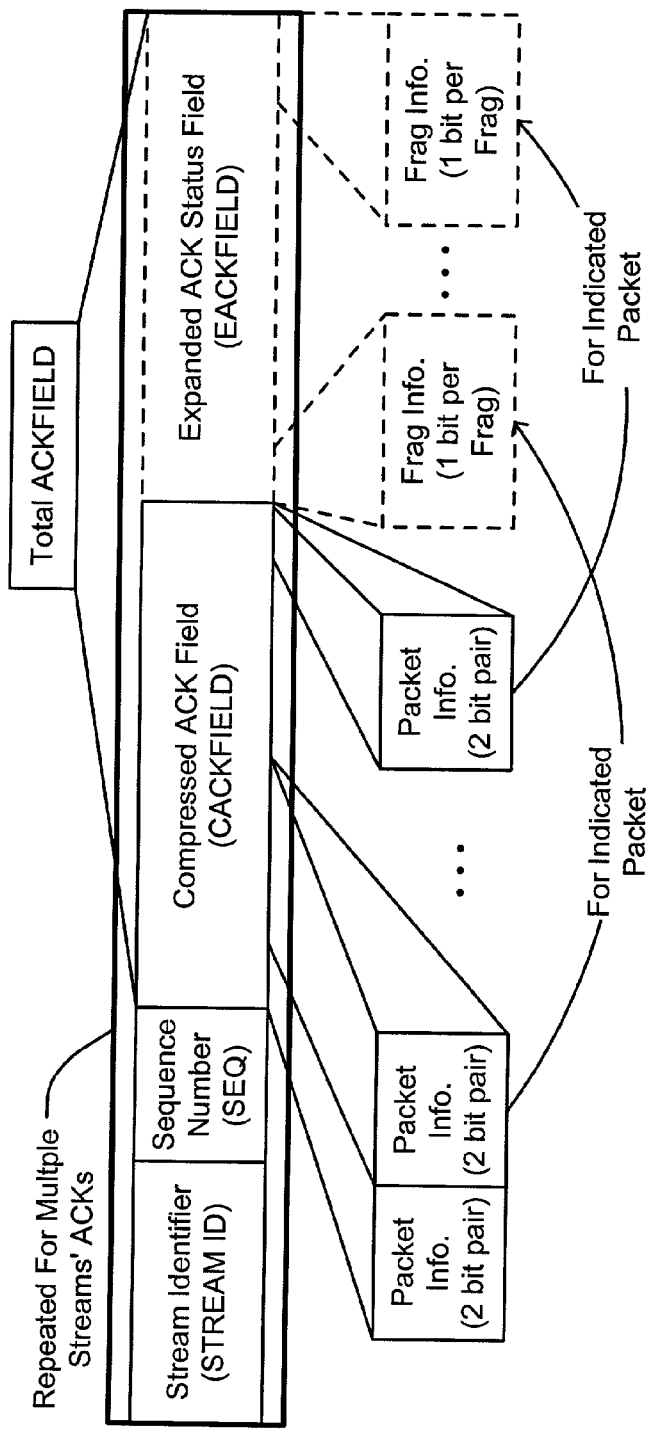
FIG. 8 is a diagram illustrating another embodiment of an AFAF that is arranged according to the invention.

FIG. 8 is a diagram illustrating another embodiment of an AFAF 800 that is arranged according to the invention. The FIG. 8 shows one particular embodiment of how the stream ID, SEQ, and ACKFIELD (including the CACKFIELD and sometimes including the EACKFIELD). The CACKFIELD is encoded using two-bit pairs, and the EACKFIELD (when used) is encoded using 1 bit per fragment portion for those indicated packets within the CACKFIELD.

The coding of the CACKFIELD may be performed as follows:

Each 2 bits of the CACKFIELD correspond to the acknowledgement status for a given packet of the uniquely identified stream, coded as follows:

B00=no ACK status available for the packet with sequence number corresponding to the position of this ACK status B01=ACK status for the packet with sequence number corresponding to the position of this ACK status is positive (this indicates that the packet is acknowledged as having been received properly by the stream destination LAN node)

B10=ACK status for the packet with sequence number corresponding to the position of this ACK status is negative (this indicates that the packet is acknowledged as NOT having been received properly by the stream destination LAN node)

B11=ACK status for the packet with sequence number corresponding to the position of this ACK status is found in an expanded ACK status field in order to accommodate the ACK status of individual fragments for this packet Multiple locations within the ACKFIELD that correspond to the ACK status for multiple packets (each with a unique sequence number) may have the expanded ACK status indication set within the EACKFIELD. Sometimes, in such cases, multiple expanded ACK status information fields will follow the compressed ACK status field; the EACKFIELD will be generated and placed after the CACKFIELD. Within the EACKFIELD, the first expanded ACK status field to appear in the frame corresponds to the first expanded status indication, the second expanded ACK status field to appear corresponds to the second expanded ACK status indication, etc.

The format of the expanded ACK status within the EACKFIELD is as follows:

Each EACKFIELD has N bits, where N corresponds to the maximum number of fragments allowed for any packet. The first bit in the field indicates the ACK status for the first fragment for the packet with sequence number corresponding to seq+x, where x corresponds to the position of the pair of bits of the compressed ACK status field with value b11 which corresponds to the position of the expanded ACK status field being examined, and SEQ is the value from the SEQ field.

The value of each bit of the EACKFIELD indicates one of two ACK status conditions:

B0=ACK status is negative (this indicates that the fragment is acknowledged as NOT having been received properly by the stream destination LAN node)

B1=ACK status is positive (this indicates that the fragment is acknowledged as having been received properly by the stream destination LAN node)

The fields "stream ID", "SEQ", and "ACKFIELD" may together be repeated within the frame to represent either additional ACK status for sequence numbers beyond that which the size of the ACKFIELD will accommodate for a given stream ID, or to accommodate ACK status for multiple stream ID values.

The ECF field is an error check field that validates the information contained within the aggregated fragment acknowledgement frame.

In one embodiment, the value of M=16 and the value of N=the maximum allowed number of fragments per packet rounded up to the nearest integer multiple of either 8 or 16 in order to make the result a whole number of octets. Most LAN technologies regard the octet as the smallest transportable quantity. Clearly, the size of the ACKFIELD may be programmable and different within different embodiments.

Figure 9:
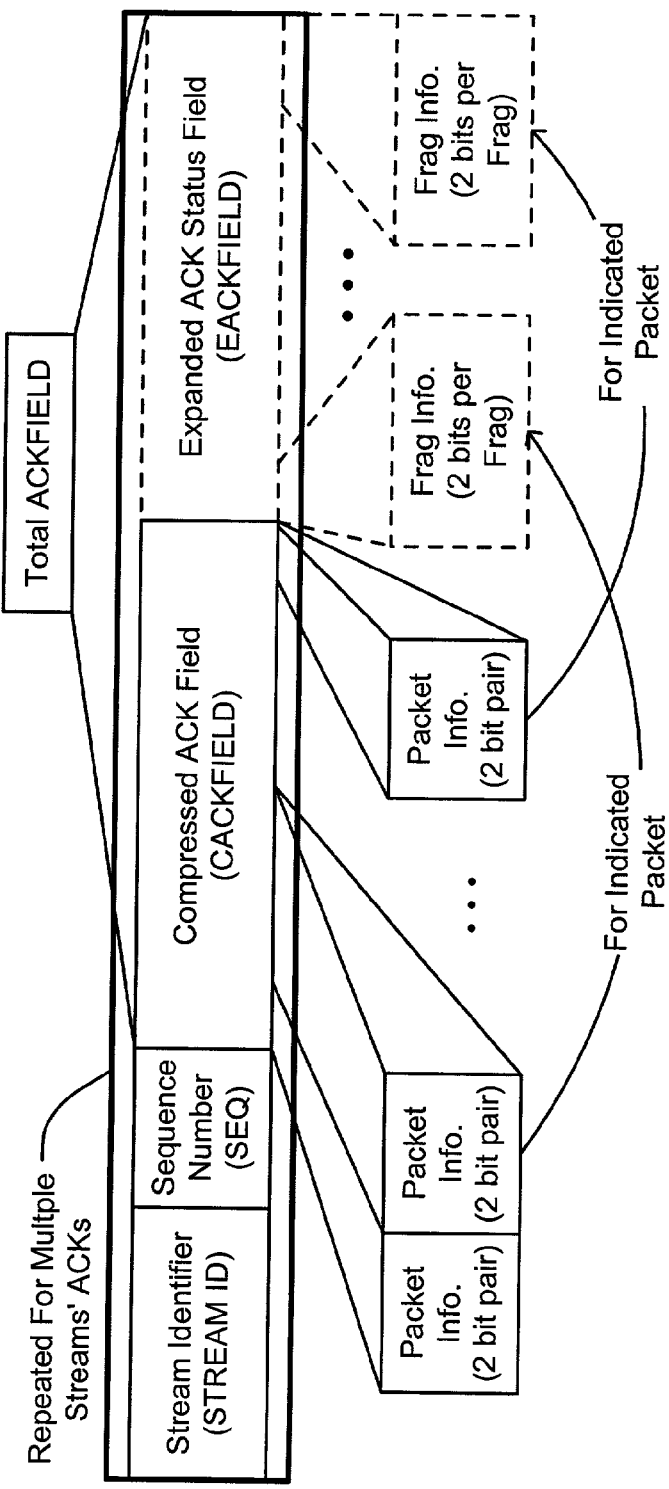
FIG. 9 is a diagram illustrating another embodiment of an AFAF that is arranged according to the invention.

FIG. 9 is a diagram illustrating another embodiment of an AFAF 900 that is arranged according to the invention. The FIG. 9 shows an embodiment similar to the embodiment of the FIG. 8 with the extension that the information corresponding to the fragments within the EACKFIELD are coded using two bits.

The coding of the EACKFIELD may be performed as follows:

Each 2 bits of the EACKFIELD correspond to the acknowledgement status for a given fragment of the uniquely identified packet, coded as follows:

B00=no ACK status available for the fragment with sequence number corresponding to the position of this ACK status B01=ACK status for the fragment with sequence number corresponding to the position of this ACK status is positive (this indicates that the fragment is acknowledged as having been received properly by the stream destination LAN node)

B10=ACK status for the fragment with sequence number corresponding to the position of this ACK status is negative (this indicates that the fragment is acknowledged as NOT having been received properly by the stream destination LAN node)

B11=(reserved)

The EACKFIELD is coded using two-bit pairs in a similar manner to the coding of the CACKFIELD.

Figure 10:
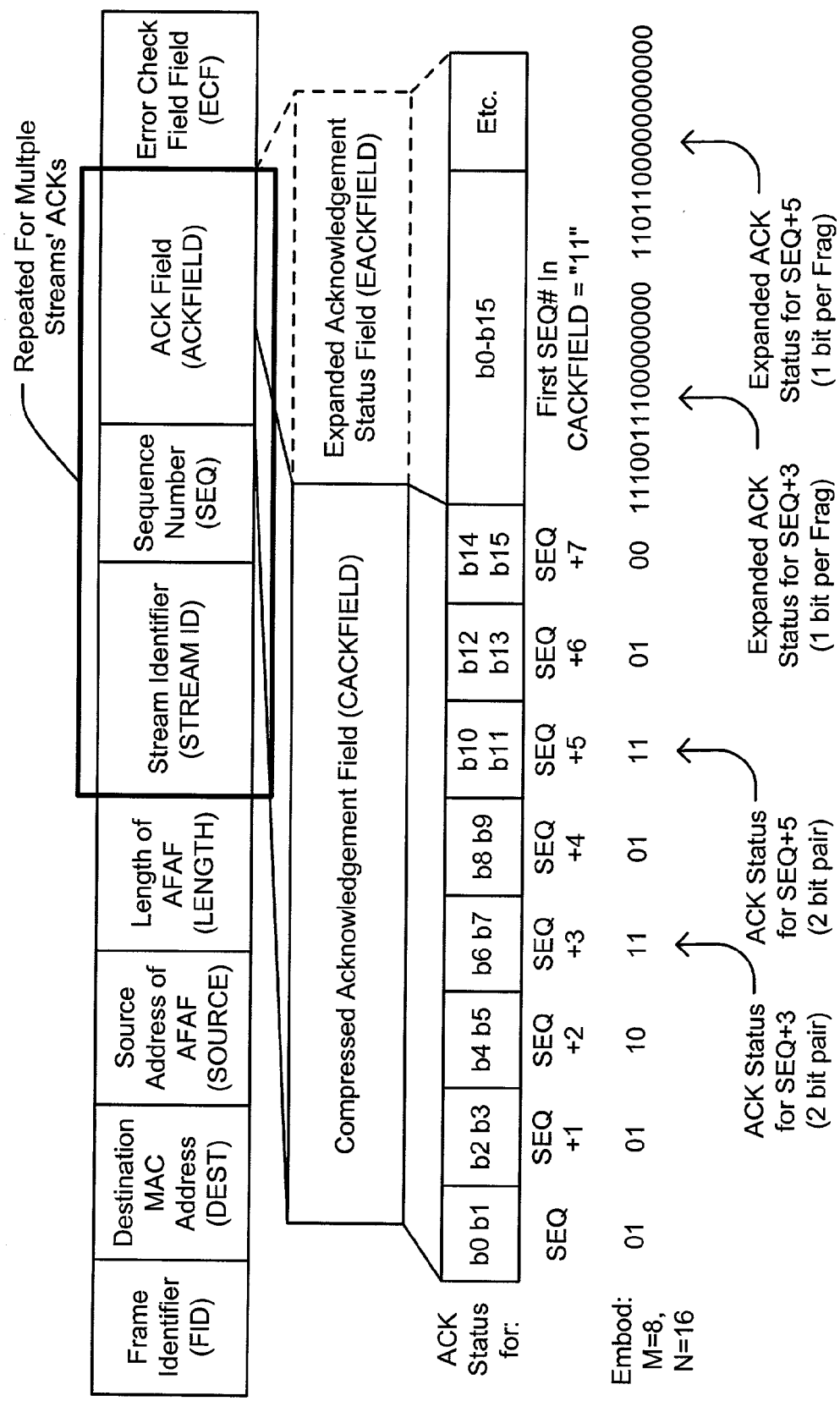
FIG. 10 is a diagram illustrating another embodiment of an AFAF that is arranged according to the invention.

FIG. 10 is a diagram illustrating another embodiment of an AFAF 1000 that is arranged according to the invention. The AFAF 1000 may be viewed as being one particular embodiment of the AFAF 800 of the FIG. 8 while also including the other portions of an AFAF including a FID, a DEST, a SOURCE, a LENGTH, a stream ID, a SEQ, an ACKFIELD (that will include a CACKFIELD and sometimes include a EACKFIELD), and an ECF.

In this embodiment, the CACKFIELD is shown as being composed of two-bit pairs for a total of 16 bits, and the EACKFIELD is shown as being composed of a single bit for a total of 16 bits. This embodiment shows two different packets whose ACK status is shown as being '11' and the status of the fragments within those packets are shown within the EACKFIELD using one bit per fragment according to the invention. In this specific embodiment, the packets with ACK status for SEQ+3 and SEQ+5 show 2-bit pairs having value '11.' The expanded status for these packets is shown as being available for 16 different fragments within an packet; each of the bits need not be used (the packet may include anywhere from 2 to 16 fragments in this embodiment). The individual status for the fragments within the packet are coded using the convention described within the FIG. 8 where one bit is used for each fragment. Clearly, the total number of bits allotted for the CACKFIELD and the EACKFIELD are selectable and/or programmable and may be different within different embodiments, and this particular embodiment is just one embodiment of how the present invention may be implemented.

Figure 11:
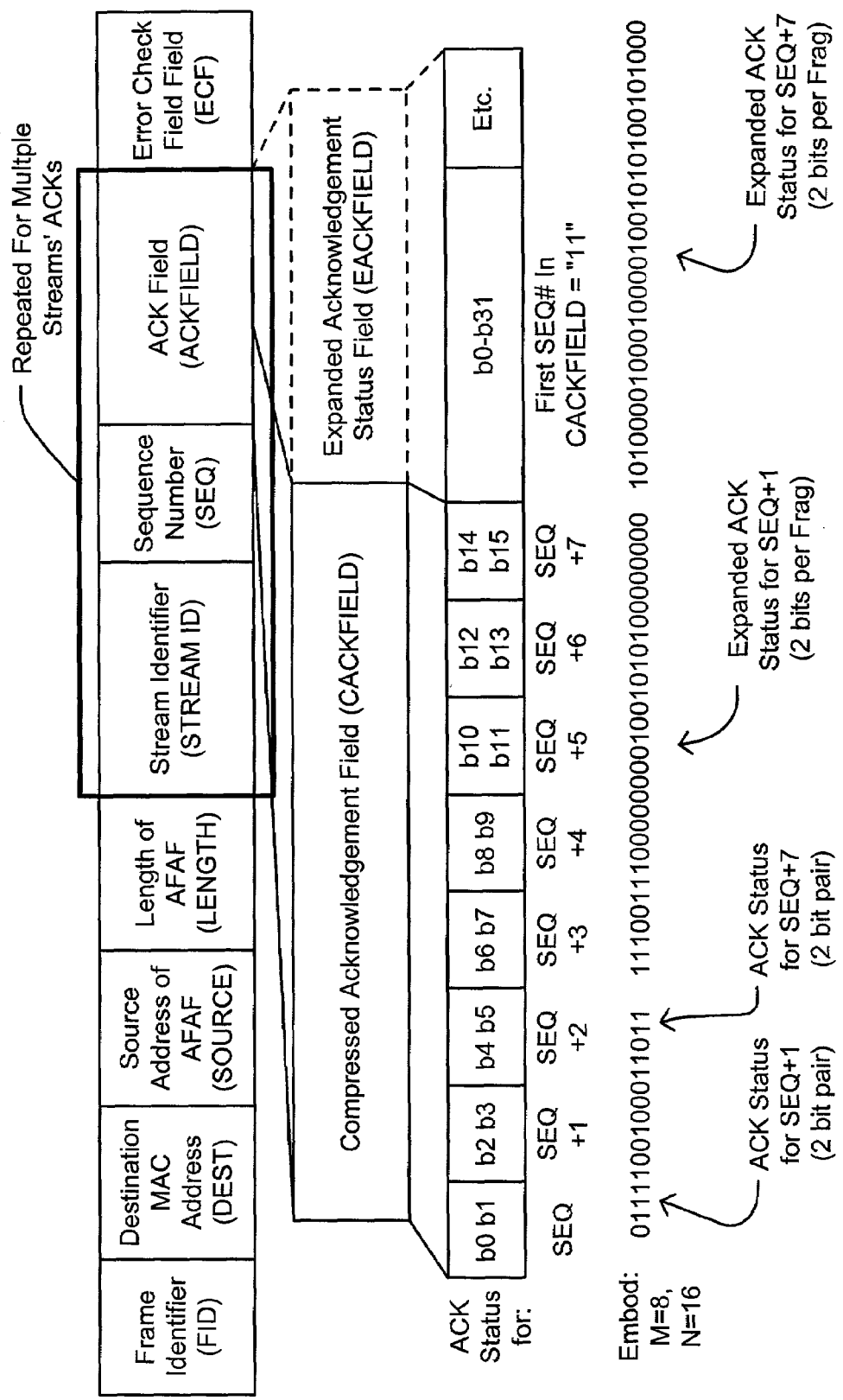
FIG. 11 is a diagram illustrating another embodiment of an AFAF that is arranged according to the invention.

FIG. 11 is a diagram illustrating another embodiment of an AFAF 1100 that is arranged according to the invention. The AFAF 1100 may be viewed as being one particular embodiment of the AFAF 900 of the FIG. 9 while also including the other portions of an AFAF including a FID, a DEST, a SOURCE, a LENGTH, a stream ID, a SEQ, an ACKFIELD (that will include a CACKFIELD and sometimes include a EACKFIELD), and an ECF.

In this embodiment, the CACKFIELD is shown as being composed of two-bit pairs for a total of 16 bits, and the EACKFIELD is shown as being composed of a single bit for a total of 16 bits. This embodiment shows two different packets whose ACK status is shown as being '11' and the status of the fragments within those packets are shown within the EACKFIELD using one bit per fragment according to the invention. In this specific embodiment, the packets with ACK status for SEQ+3 and SEQ+5 show 2-bit pairs having value '11.' The expanded status for these packets is shown as being available for 16 different fragments within an packet; each of the bits need not be used (the packet may include anywhere from 2 to 16 fragments in this embodiment). The individual status for the fragments within the packet are coded using the convention described within the FIG. 9 where two-bit pairs are used for each fragment. Clearly, the total number of bits allotted for the CACKFIELD and the EACKFIELD are selectable and/or programmable and may be different within different embodiments, and this particular embodiment is just one embodiment of how the present invention may be implemented.

Figure 12:
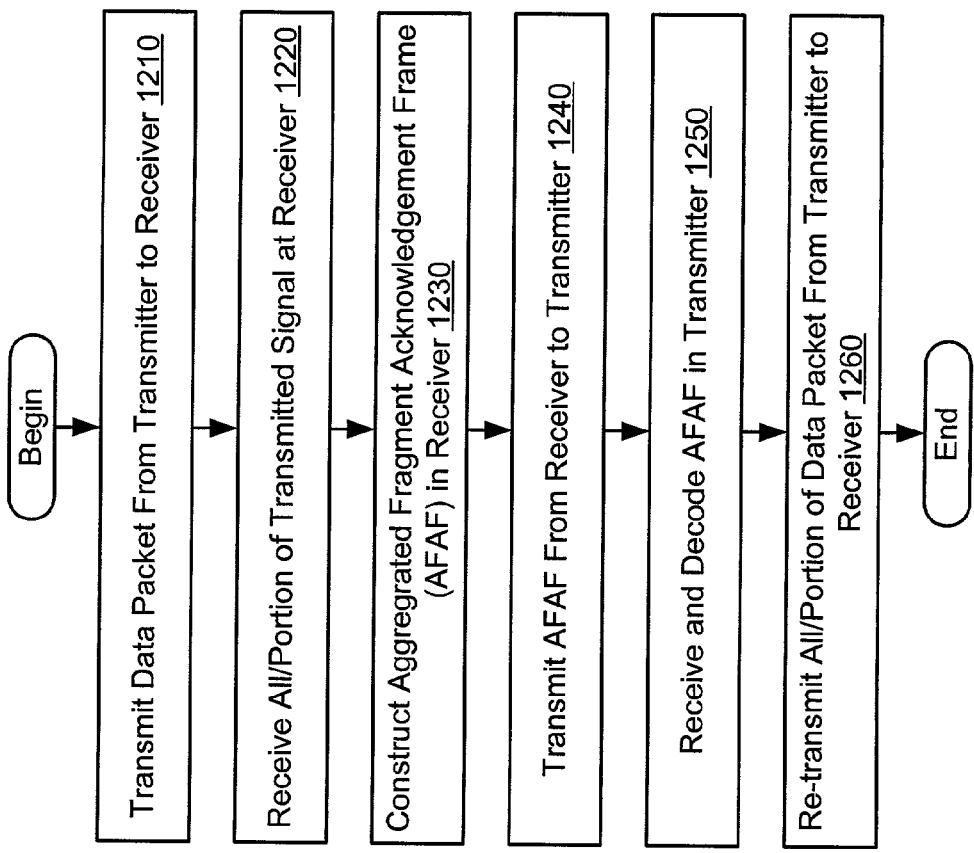
FIG. 12 is a flow diagram illustrating an embodiment of a WLAN communication method that is performed according to the invention.

FIG. 12 is a flow diagram illustrating an embodiment of a WLAN communication method 1200 that is performed according to the invention. In a block 1210, a data packet is transmitted from a transmitter to a receiver. In a block 1220, all or a portion of the transmitted signal is received by the receiver. An AFAF is constructed within a receiver in a block 1230. The AFAF includes information of the success and/or failure, in full or in part, of the transmission of the data packet to the receiver based on the AFAF.

The AFAF is then transmitted from the receiver to the transmitter in a block 1240. The AFAF is then received and decoded in the transmitter as shown in a block 1250. Then, all or a portion of the data packet is re-transmitted from the transmitter to the receiver based on the information of the AFAF. Only those portions of the data packet that have failed to arrive properly at the receiver need be re-transmitted from the transmitter to the receiver.

Figure 13:
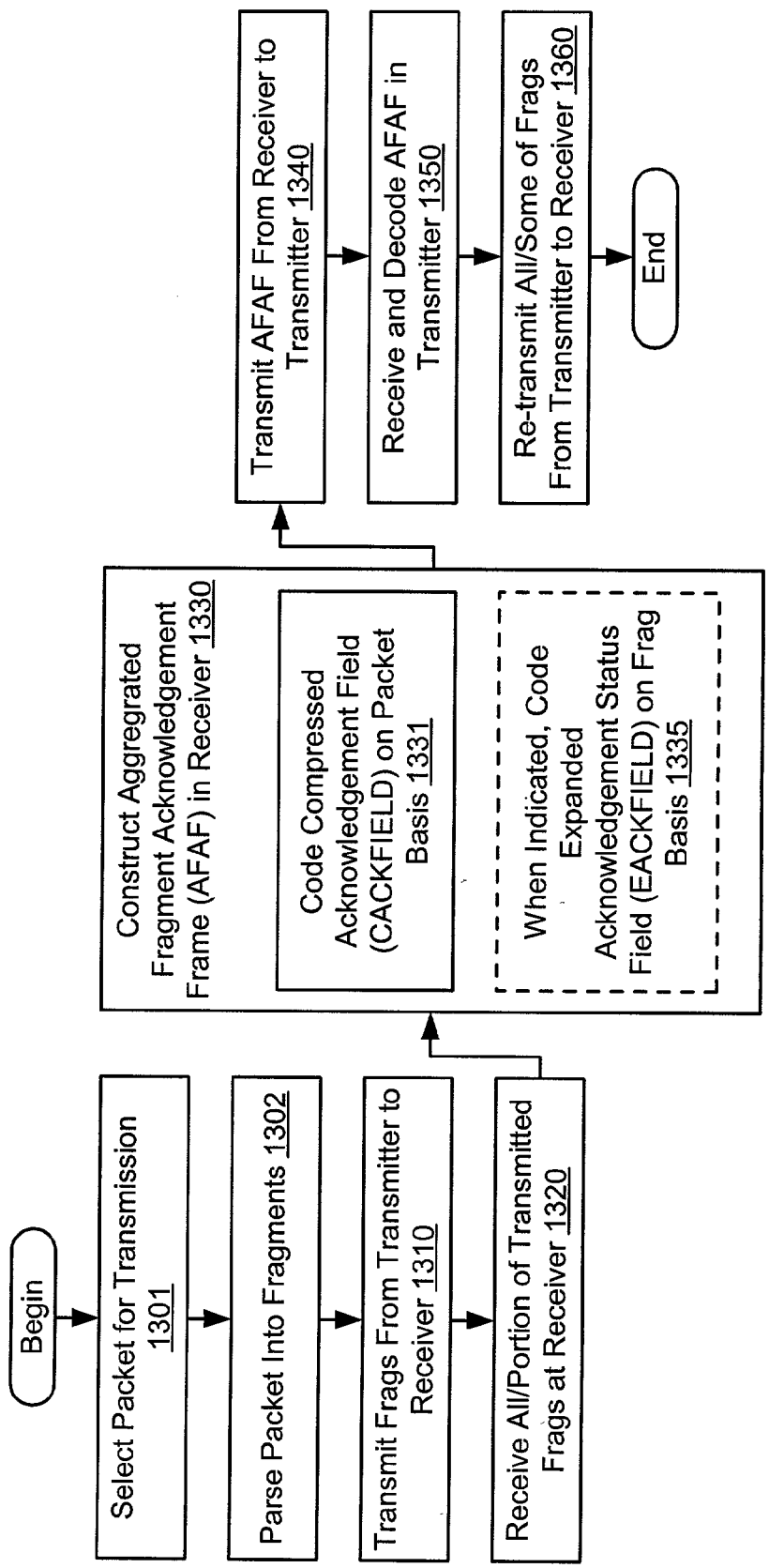
FIG. 13 is a flow diagram illustrating another embodiment of a WLAN communication method that is performed according to the invention.

FIG. 13 is a flow diagram illustrating another embodiment of a WLAN communication method 1300 that is performed according to the invention. In a block 1301, an packet is selected for transmission. In a block 1302, the packet is parsed into a number of fragments. In a block 1310, the fragments are transmitted from a transmitter to a receiver. In a block 1320, all or a portion of the fragments are received at the receiver.

In a block 1330, an AFAF is constructed at the receiver based on the success and/or failure, in full or in part, of the transmission of the fragments within the data packet from the transmitter to the receiver. This involves coding a CACKFIELD within the AFAF on an packet basis as shown in a block 1331. When indicated within the CACKFIELD coding within the block 1331, an EACKFIELD is coded on a fragment basis as shown in a block 1335. This coding of the EACKFIELD may be performed on a single bit per fragment basis or a two-bit pair per fragment basis in various embodiments.

The AFAF is then transmitted from the receiver to the transmitter in a block 1340. The AFAF is then received and decoded in the transmitter as shown in a block 1350. Then, all or a portion of the data packet is re-transmitted from the transmitter to the receiver based on the information of the AFAF. Only those portions of the data packet, which may pertain only to some fragments of an packet, that have failed to arrive properly at the receiver need be retransmitted from the transmitter to the receiver. This may provide a much improved efficiency when compared to prior art approaches that will require the re-sending of an entire packet when a single fragment therein has failed to be transmitted and received properly.

Figure 14:
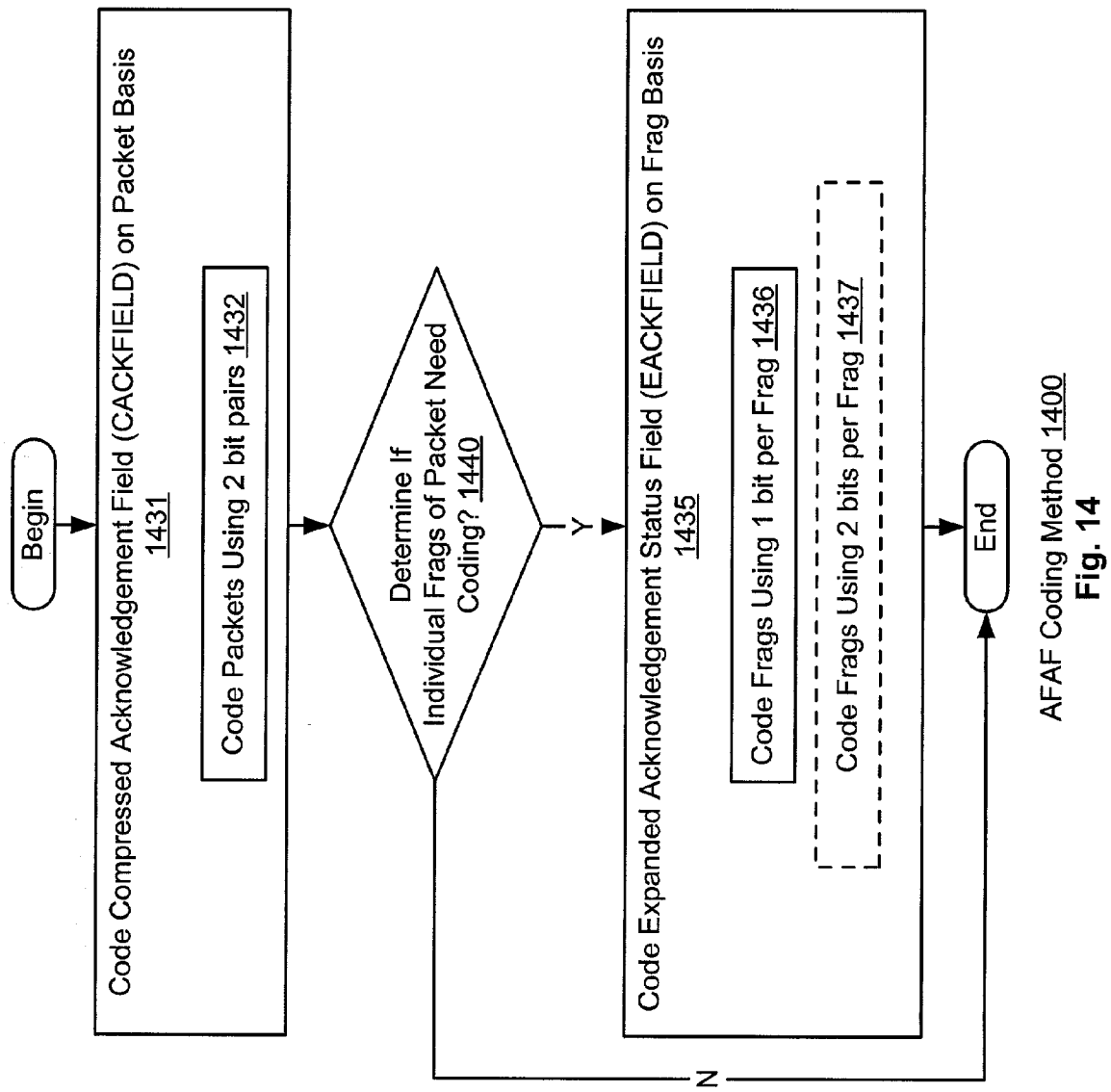
FIG. 14 is a flow diagram illustrating an embodiment of an AFAF coding method that is performed according to the invention.

FIG. 14 is a flow diagram illustrating an embodiment of an AFAF coding method 1400 that is performed according to the invention. In a block 1431, CACKFIELD is coded on an packet basis. This coding of the packets is performed using 2-bit pairs within the CACKFIELD. In a decision block 1440, it is determined that individual fragments of any one of the packets that have been coded within the block 1431 need further resolution for any of the individual fragment portions. The packet may be coded within the block 1431 using '11' 2-bit pair.

If is determined that no further specificity is required for any of the individual fragments of an packet in the decision block 1440, then the AFAF coding method 1400 terminates. Alternatively, if is determined that further specificity is in fact required for any of the individual fragments of an packet in the decision block 1440, then an EACKFIELD is coded on a per fragment basis as shown in a block 1435. This coding of the EACKFIELD may be performed using 1 bit per fragment portion as shown in a block 1436. In alternative embodiments, this coding of the EACKFIELD may be performed using 2 bits per fragment portion as shown in a block 1437.

Figure 15:
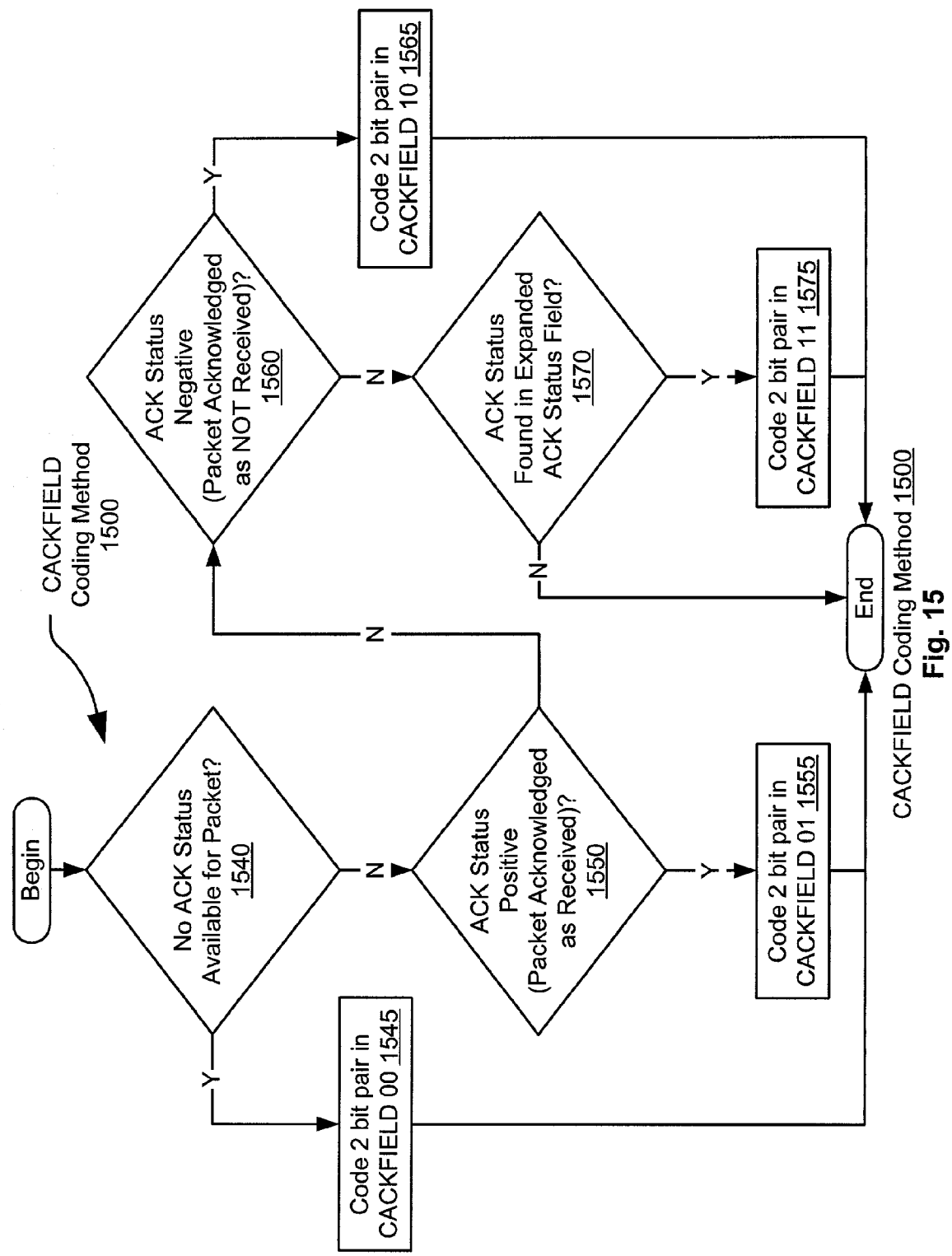
FIG. 15 is a flow diagram illustrating an embodiment of a CACKFIELD coding method that is performed according to the invention.

FIG. 15 is a flow diagram illustrating an embodiment of a CACKFIELD coding method 1500 that is performed according to the invention. In a decision block 1540, it is determined whether an ACK status is available for a packet. If an ACK status is in fact available as determined in the decision block 1540, then a 2-bit pair within a CACKFIELD is coded using B00 as shown in a block 1545. This coding of the 2-bit pair as being B00 indicates that no ACK status available for the packet with sequence number corresponding to the position of this ACK status. However, if an ACK status is in fact available as determined in the decision block 1540, then the CACKFIELD coding method 1500 continues on to a decision block 1550.

In the decision block 1550, it is determined whether an ACK status is positive. If the ACK status is in fact positive as determined in the decision block 1550, then a 2-bit pair within a CACKFIELD is coded using B01 as shown in a block 1555. This coding of the 2-bit pair as being B01 indicates that ACK status for the packet with sequence number corresponding to the position of this ACK status is positive. This indicates that the packet is acknowledged as having been received properly by the stream destination LAN node. However, if the ACK status is not positive as determined in the decision block 1550, then the CACKFIELD coding method 1500 continues on to a decision block 1560.

In the decision block 1560, it is determined whether an ACK status is negative. If the ACK status is in fact negative as determined in the decision block 1560, then a 2-bit pair within a CACKFIELD is coded using B10 as shown in a block 1565. This coding of the 2-bit pair as being B10 indicates that ACK status for the packet with sequence number corresponding to the position of this ACK status is negative. This indicates that the packet is acknowledged as NOT having been received properly by the stream destination LAN node. However, if the ACK status is not negative as determined in the decision block 1560, then the CACKFIELD coding method 1500 continues on to a decision block 1570.

In the decision block 1570, it is determined whether an ACK status is found to be expanded. If the ACK status is in fact expanded as determined in the decision block 1570, then a 2-bit pair within a CACKFIELD is coded using B11 as shown in a block 1575. This coding of the 2-bit pair as being B11 indicates that ACK status for the packet with sequence number corresponding to the position of this ACK status is found in an expanded ACK status field in order to accommodate the ACK status of individual fragments for this packet. However, if the ACK status is not negative as determined in the decision block 1570, then the CACKFIELD coding method 1500 terminates.

Figure 16:
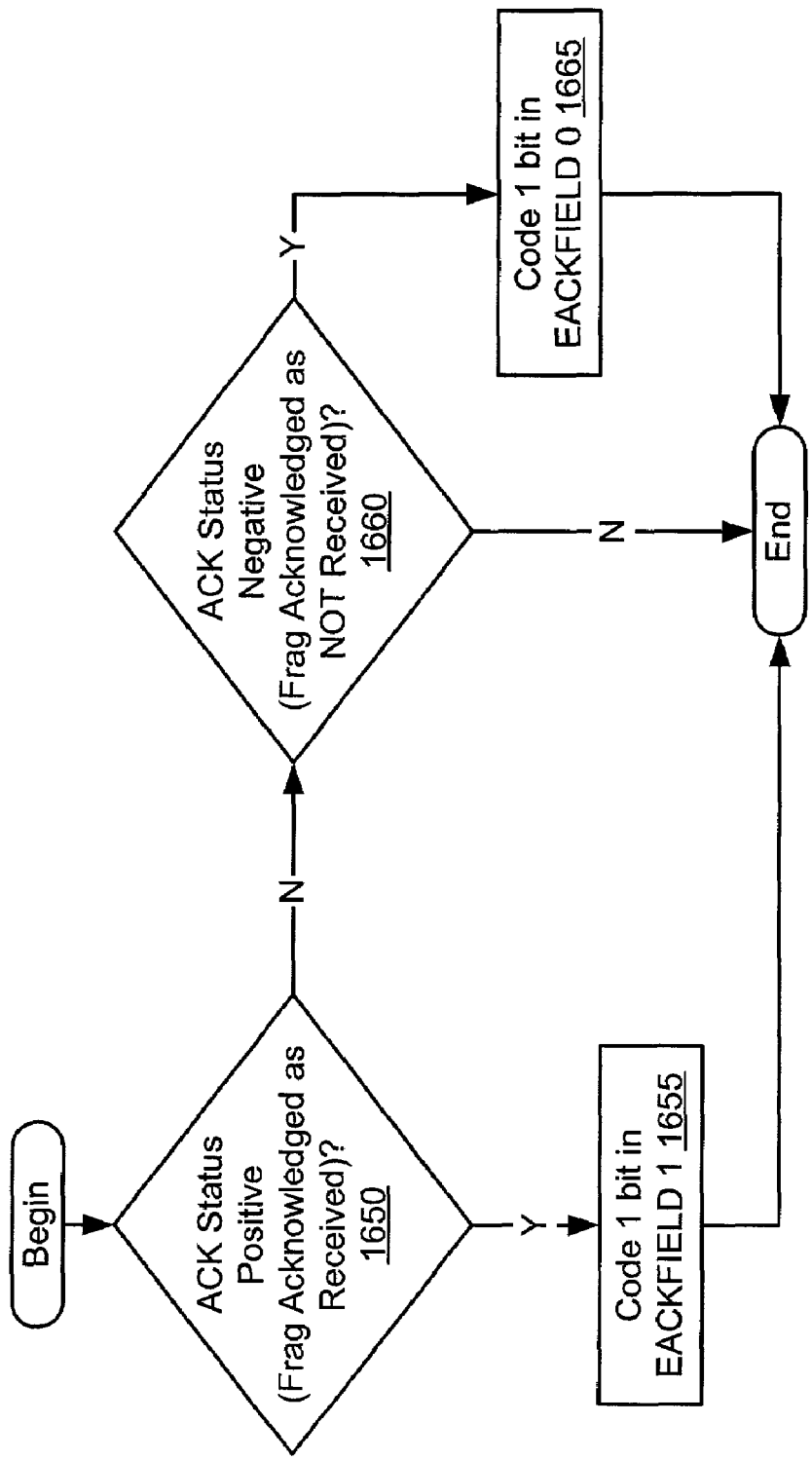
FIG. 16 is a flow diagram illustrating an embodiment of an EACKFIELD coding method that is performed according to the invention.

FIG. 16 is a flow diagram illustrating an embodiment of an EACKFIELD coding method 1600 that is performed according to the invention. In the decision block 1650, it is determined whether an ACK status is positive. If the ACK status is in fact positive as determined in the decision block 1650, then a single bit within a EACKFIELD is coded using B1 as shown in a block 1655. This coding of the single bit as being B1 indicates that the ACK status is positive. This indicates that the fragment is acknowledged as having been received properly by the stream destination LAN node. However, if the ACK status is not positive as determined in the decision block 1650, then the EACKFIELD coding method 1600 continues on to a decision block 1660.

In the decision block 1660, it is determined whether an ACK status is negative. If the ACK status is in fact negative as determined in the decision block 1650, then a single bit within the EACKFIELD is coded using BO as shown in a block 1665. This coding of the single bit as being BO indicates that the ACK status is negative. This indicates that the fragment is acknowledged as NOT having been received properly by the stream destination LAN node. However, if the ACK status is not negative as determined in the decision block 1660, then the EACKFIELD coding method 1600 terminates.

FIG. 17 is a flow diagram illustrating another embodiment of an EACKFIELD coding method 1700 that is performed according to the invention. In a decision block 1740, it is determined whether an ACK status is available for a fragment. If an ACK status is in fact available as determined in the decision block 1740, then a 2-bit pair within a EACKFIELD is coded using B00 as shown in a block 1745. This coding of the 2-bit pair as being B00 indicates that no ACK status available for the fragment that has been indicated for a particular sequence number within the CACKFIELD with sequence number corresponding to the position of this ACK status. However, if an ACK status is in fact available as determined in the decision block 1740, then the EACKFIELD coding method 1700 continues on to a decision block 1750.

In the decision block 1750, it is determined whether an ACK status is positive. If the ACK status is in fact positive as determined in the decision block 1750, then a 2-bit pair within a EACKFIELD is coded using B01 as shown in a block 1755. This coding of the 2-bit pair as being B01 indicates that the ACK status for the fragment with sequence number corresponding to the position of this ACK status is positive. This indicates that the fragment that has been indicated for a particular sequence number within the CACKFIELD is acknowledged as having been received properly by the stream destination LAN node. However, if the ACK status is not positive as determined in the decision block 1750, then the EACKFIELD coding method 1700 continues on to a decision block 1760.

In the decision block 1760, it is determined whether an ACK status is negative. If the ACK status is in fact negative as determined in the decision block 1760, then a 2-bit pair within a EACKFIELD is coded using B10 as shown in a block 1765.

This coding of the 2-bit pair as being B10 indicates that ACK status for the fragment that has been indicated for a particular sequence number within the CACKFIELD corresponding to the position of this ACK status is negative. This indicates that the fragment is acknowledged as NOT having been received properly by the stream destination LAN node. However, if the ACK status is not negative as determined in the decision block 1760, then the EACKFIELD coding method 1700 terminates.

It is noted that many of the various embodiments described herein refer to implementations of communication systems employing WLANs. The present invention is also adaptable to wireline LANs as well without departing from the scope and spirit of the invention. There may be wireline LANs that require a very high degree of reliability. The present invention may provide that high degree of reliability.

In view of the above detailed description of the invention and associated drawings, other modifications and variations will now become apparent. It should also be apparent that such other modifications and variations may be effected without departing from the spirit and scope of the invention.

What is claimed is:

1. A wireless local area network method, comprising:
   transmitting data from a transmitter to a receiver within a wireless local area network;
   receiving a portion of the data at the receiver;
   determining a status of the portion of the received data that corresponds to a positive acknowledgement, a negative acknowledgement, or an indication of a lack of information regarding the status of delivery of the portion of the received data;
   constructing an aggregated fragment acknowledgement frame that indicates the status of the portion of the received data, the portion of the received data comprising a fragment portion;
   transmitting the aggregated fragment acknowledgement frame from the receiver to the transmitter;
   receiving the aggregated fragment acknowledgement frame at the transmitter;
   decoding the aggregated fragment acknowledgement frame at the transmitter; and
   selectively re-sending at least one additional portion of the data from the transmitter to the receiver based on the indicated status of the portion of the received data; and wherein:
   the indicated status of the portion of the received data, within the aggregated fragment acknowledgement frame, comprises an acknowledgement status field;
   the acknowledgement status field comprising a compressed acknowledgement status field and selectively comprising an expanded acknowledgement status field when indicated by information within the compressed acknowledgement status field;
   the compressed acknowledgement status field comprises a plurality of two-bit pairs to indicate status of a plurality of medium access controller service data units; and
   the expanded acknowledgement status field comprises at least one bit to indicate status of a fragment portion of at least one of the medium access controller service data units within the plurality of medium access controller service data units.

2. The method of claim 1, wherein the portion of the received data, received at the receiver, comprises a medium access controller service data unit.

3. The method of claim 1, wherein the portion of the received data, received at the receiver, comprises a fragment portion of a medium access controller service data unit.

4. The method of claim 1, wherein the indicated status of the portion of the received data, within the aggregated fragment acknowledgement frame, comprises information arranged on a per medium access controller service data unit basis.

5. The method of claim 1, wherein the indicated status of the portion of the received data, within the aggregated fragment acknowledgement frame, comprises information arranged on a per fragment portion of a medium access controller service data unit basis.

6. The method of claim 1, wherein:
   the portion of the received data includes a plurality of fragment portions; and
   a number of bits within the expanded acknowledgement status field is same as a number of fragment portions within the plurality of fragment portions such that each bit within the expanded acknowledgement status field corresponds to only one fragment portion within the plurality of fragment portions.

7. The method of claim 1, wherein:
   the expanded acknowledgement status field comprises a plurality of two-bit pairs to indicate status of a fragment portion of at least one of the medium access controller service data units within the plurality of medium access controller service data units.

8. The method of claim 1, wherein the compressed acknowledgement status field comprises at least one of:
   no acknowledgement status available for a data packet with a sequence number corresponding to a position of an acknowledgement status;
   a positive acknowledgement status for the data packet with the sequence number corresponding to the position of the acknowledgement status thereby indicating that the data packet is acknowledged as having been received properly by a stream destination local area network node;
   a negative acknowledgement status for the data packet with the sequence number corresponding to the position of the acknowledgement status thereby indicating that the data packet is acknowledged as not having been received properly by the stream destination local area network node; and
   an acknowledgement status for the data packet with a sequence number corresponding to the position of the acknowledgement status is found in an expanded acknowledgement status field in order to accommodate the acknowledgement status of a plurality of fragments portions for the data packet.

9. The method of claim 8, wherein the expanded acknowledgement status field comprises at least one of:
   a negative acknowledgement status for a fragment portion thereby indicating that the fragment portion is acknowledged as not having been received properly by the stream destination local area network node; and
   a positive acknowledgement status for the fragment portion thereby indicating that the fragment portion is acknowledged as having been received properly by the stream destination local area network node.

10. The method of claim 8, wherein the expanded acknowledgement status field comprises at least one of:
    no acknowledgement status available for a fragment portion;
    a positive acknowledgement status for the fragment portion thereby indicating that the fragment portion is acknowledged as having been received properly by a stream destination local area network node; and a negative acknowledgement status for the fragment portion thereby indicating that the fragment portion is acknowledged as not having been received properly by the stream destination local area network node.

11. The method of claim 1, wherein the method is performed within a medium access controller/baseband processor.

12. The method of claim 11, wherein the method is performed in a medium access controller portion of the medium access controller/baseband processor.

13. The method of claim 12, wherein the medium access controller portion comprises an IEEE 802.11 operable medium access controller.

14. The method of claim 11, wherein the medium access controller/baseband processor is communicatively coupled to a radio circuitry.

15. The method of claim 14, wherein the radio circuitry comprises a diversified antenna; and
the radio circuitry is operable to perform direct conversion from a radio frequency to a baseband frequency.

16. The method of claim 1, wherein the method is performed within a transceiver.

17. The method of claim 1, at least one of the transmitter and the receiver comprises a mobile unit.

18. The method of claim 1, wherein the wireless local area network comprises functionality that is operable to connect to an external network.

19. The method of claim 18, wherein the functionality that is operable to connect to an external network is contained within a base station.

20. The method of claim 18, wherein the external network comprises at least one of the Internet, a microwave communication network, and a satellite communication network.

21. A wireless local area network method, comprising:
selecting a medium access controller service data unit for transmission;
parsing the medium access controller service data unit into a plurality of fragment portions;
transmitting the plurality of fragment portions from a transmitter to a receiver within a wireless local area network;
receiving at least one fragment portion of the plurality of fragment portions at the receiver;
determining a status of the at least one fragment portion;
constructing an aggregated fragment acknowledgement frame that indicates the status of the at least one fragment portion, the aggregated fragment acknowledgement frame comprising a compressed acknowledgement status field and an expanded acknowledgement status field;
transmitting the aggregated fragment acknowledgement frame from the receiver to the transmitter;
receiving the aggregated fragment acknowledgement frame at the transmitter;
decoding the aggregated fragment acknowledgement frame at the transmitter; and
selectively re-sending at least one additional fragment portion from the transmitter to the receiver based on the indicated status of the at least one fragment portion; and
wherein the compressed acknowledgement status field comprises a plurality of two-bit pairs to indicate status of a plurality of medium access controller service data units; and
the expanded acknowledgement status field comprises a single bit to indicate status of the at least one fragment portion.

22. The method of claim 21, wherein the expanded acknowledgement status field comprises a two-bit pair to indicate status of the at least one fragment portion.

23. The method of claim 21, wherein the compressed acknowledgement status field that comprises at least one of:
no acknowledgement status available for the medium access controller service data unit with a sequence number corresponding to a position of an acknowledgement status;
a positive acknowledgement status for the medium access controller service data unit with the sequence number corresponding to the position of the acknowledgement status thereby indicating that the medium access controller service data is acknowledged as having been received properly by a stream destination local area network node;
a negative acknowledgement status for the medium access controller service data with the sequence number corresponding to the position of the acknowledgement status thereby indicating that the medium access controller service data is acknowledged as not having been received properly by the stream destination local area network node; and
an acknowledgement status for the medium access controller service data with a sequence number corresponding to the position of the acknowledgement status is found in the expanded acknowledgement status field in order to accommodate the acknowledgement status of the at least one fragment portion for the medium access controller service data.

24. The method of claim 23, wherein the expanded acknowledgement status field comprises at least one of:
a negative acknowledgement status for the at least one fragment portion thereby indicating that the at least one fragment portion is acknowledged as not having been received properly by the stream destination local area network node; and
a positive acknowledgement status for the at least one fragment portion thereby indicating that the at least one fragment portion is acknowledged as having been received properly by the stream destination local area network node.

25. The method of claim 23, wherein the expanded acknowledgement status field comprises at least one of:
no acknowledgement status available for the at least one fragment portion;
a positive acknowledgement status for the at least one fragment portion thereby indicating that the at least one fragment portion is acknowledged as having been received properly by a stream destination local area network node; and
a negative acknowledgement status for the at least one fragment portion thereby indicating that the at least one fragment portion is acknowledged as not having been received properly by the stream destination local area network node.

26. The method of claim 21, wherein the method is performed within a medium access controller/baseband processor.

27. The method of claim 26, wherein the method is performed in a medium access controller portion of the medium access controller/baseband processor.

28. The method of claim 27, wherein the medium access controller portion comprises an IEEE 802.11 operable medium access controller.

29. The method of claim 26, wherein the medium access controller/baseband processor is communicatively coupled to a radio circuitry.

30. The method of claim 29, wherein the radio circuitry comprises a diversified antenna; and
the radio circuitry is operable to perform direct conversion from a radio frequency to a baseband frequency.

31. The method of claim 21, wherein the method is performed within a transceiver.

32. The method of claim 21, at least one of the transmitter and the receiver comprises a mobile unit.

33. The method of claim 21, wherein the wireless local area network comprises functionality that is operable to connect to an external network.

34. The method of claim 33, wherein the functionality that is operable to connect to an external network is contained within a base station.

35. The method of claim 33, wherein the external network comprises at least one of the Internet, a microwave communication network, and a satellite communication network.

36. A wireless local area network method, comprising:
selecting a medium access controller service data unit for transmission;
parsing the medium access controller service data unit into a plurality of fragment portions;
transmitting the plurality of fragment portions from a transmitter to a receiver within a wireless local area network;
receiving at least one fragment portion of the plurality of fragment portions at the receiver;
determining a status of the at least one fragment portion;
constructing an aggregated fragment acknowledgement frame that indicates the status of the at least one fragment portion, the aggregated fragment acknowledgement frame comprising a compressed acknowledgement status field and an expanded acknowledgement status field;
transmitting the aggregated fragment acknowledgement frame from the receiver to the transmitter;
receiving the aggregated fragment acknowledgement frame at the transmitter;
decoding the aggregated fragment acknowledgement frame at the transmitter; and
selectively re-sending at least one additional fragment portion from the transmitter to the receiver based on the indicated status of the at least one fragment portion; and
wherein the compressed acknowledgement status field comprises a plurality of two-bit pairs to indicate status of a plurality of medium access controller service data units, the compressed acknowledgement status field that comprises at least one of:
no acknowledgement status available for the medium access controller service data unit with a sequence number corresponding to a position of an acknowledgement status;
a positive acknowledgement status for the medium access controller service data unit with the sequence number corresponding to the position of the acknowledgement status thereby indicating that the medium access controller service data is acknowledged as having been received properly by a stream destination local area network node;
a negative acknowledgement status for the medium access controller service data with the sequence number corresponding to the position of the acknowledgement status thereby indicating that the medium access controller service data is acknowledged as not having been received properly by the stream destination local area network node; and
an acknowledgement status for the medium access controller service data with a sequence number corresponding to the position of the acknowledgement status is found in the expanded acknowledgement status field in order to accommodate the acknowledgement status of the at least one fragment portion for the medium access controller service data.

37. The method of claim 36, wherein the expanded acknowledgement status field comprises a single bit to indicate status of the at least one fragment portion.

38. The method of claim 37, wherein the expanded acknowledgement status field comprises at least one of:
a negative acknowledgement status for the at least one fragment portion thereby indicating that the at least one fragment portion is acknowledged as not having been received properly by the stream destination local area network node; and
a positive acknowledgement status for the at least one fragment portion thereby indicating that the at least one fragment portion is acknowledged as having been received properly by the stream destination local area network node.

39. The method of claim 36, wherein the expanded acknowledgement status field comprises a two-bit pair to indicate status of the at least one fragment portion.

40. The method of claim 39, wherein the expanded acknowledgement status field comprises at least one of:
no acknowledgement status available for the at least one fragment portion;
a positive acknowledgement status for the at least one fragment portion thereby indicating that the at least one fragment portion is acknowledged as having been received properly by a stream destination local area network node; and
a negative acknowledgement status for the at least one fragment portion thereby indicating that the at least one fragment portion is acknowledged as not having been received properly by the stream destination local area network node.

41. The method of claim 36, wherein the method is performed within a medium access controller/baseband processor.

42. The method of claim 41, wherein the method is performed in a medium access controller portion of the medium access controller/baseband processor.

43. The method of claim 42, wherein the medium access controller portion comprises an IEEE 802.11 operable medium access controller.

44. The method of claim 41, wherein the medium access controller/baseband processor is communicatively coupled to a radio circuitry.

45. The method of claim 44, wherein the radio circuitry comprises a diversified antenna; and
the radio circuitry is operable to perform direct conversion from a radio frequency to a baseband frequency.

46. The method of claim 36, wherein the method is performed within a transceiver.

47. The method of claim 36, at least one of the transmitter and the receiver comprises a mobile unit.

48. The method of claim 36, wherein the wireless local area network comprises functionality that is operable to connect to an external network.

49. The method of claim 48, wherein the functionality that is operable to connect to an external network is contained within a base station.

50. The method of claim 48, wherein the external network comprises at least one of the Internet, a microwave communication network, and a satellite communication network.

51. A wireless local area network method, comprising:
selecting a medium access controller service data unit for transmission;
parsing the medium access controller service data unit into a plurality of fragment portions;
transmitting the plurality of fragment portions from a transmitter to a receiver within a wireless local area network;
receiving at least one fragment portion of the plurality of fragment portions at the receiver;
determining a status of the at least one fragment portion;
constructing an aggregated fragment acknowledgement frame that indicates the status of the at least one fragment portion, the aggregated fragment acknowledgement frame comprising a compressed acknowledgement status field and an expanded acknowledgement status field;
transmitting the aggregated fragment acknowledgement frame from the receiver to the transmitter;
receiving the aggregated fragment acknowledgement frame at the transmitter;
decoding the aggregated fragment acknowledgement frame at the transmitter; and
selectively re-sending at least one additional fragment portion from the transmitter to the receiver based on the indicated status of the at least one fragment portion; and
wherein the compressed acknowledgement status field comprises a two-bit pair to indicate status of the medium access controller service data unit;
wherein the expanded acknowledgement status field comprises at least one bit to indicate status of at least one fragment portion of the medium access controller service data unit; and
wherein the expanded acknowledgement status field comprises a single bit to indicate status of the at least one fragment portion;
the expanded acknowledgement status field comprises at least one of:
a negative acknowledgement status for the at least one fragment portion thereby indicating that the at least one fragment portion is acknowledged as not having been received properly by the stream destination local area network node; and
a positive acknowledgement status for the at least one fragment portion thereby indicating that the at least one fragment portion is acknowledged as having been received properly by the stream destination local area network node.

52. A wireless local area network method, comprising:
selecting a medium access controller service data unit for transmission;
parsing the medium access controller service data unit into a plurality of fragment portions;
transmitting the plurality of fragment portions from a transmitter to a receiver within a wireless local area network;
receiving at least one fragment portion of the plurality of fragment portions at the receiver;
determining a status of the at least one fragment portion;
constructing an aggregated fragment acknowledgement frame that indicates the status of the at least one fragment portion, the aggregated fragment acknowledgement frame comprising a compressed acknowledgement status field and an expanded acknowledgement status field;
transmitting the aggregated fragment acknowledgement frame from the receiver to the transmitter;
receiving the aggregated fragment acknowledgement frame at the transmitter;
decoding the aggregated fragment acknowledgement frame at the transmitter; and
selectively re-sending at least one additional fragment portion from the transmitter to the receiver based on the indicated status of the at least one fragment portion; and
wherein the compressed acknowledgement status field comprises a two-bit pair to indicate status of the medium access controller service data unit;
wherein the expanded acknowledgement status field comprises at least one bit to indicate status of at least one fragment portion of the medium access controller service data unit; and
wherein the expanded acknowledgement status field comprises a two-bit pair to indicate status of the at least one fragment portion;
the expanded acknowledgement status field comprises at least one of:
no acknowledgement status available for the at least one fragment portion;
a positive acknowledgement status for the at least one fragment portion thereby indicating that the at least one fragment portion is acknowledged as having been received properly by a stream destination local area network node; and
a negative acknowledgement status for the at least one fragment portion thereby indicating that the at least one fragment portion is acknowledged as not having been received properly by the stream destination local area network node.

53. A wireless local area network interactive device, comprising:
a medium access controller that is operable to determine status of a portion of received data and construct an aggregated fragment acknowledgement frame that indicates status of the portion of the received data, wherein the status corresponds to a positive acknowledgement status, a negative acknowledgement status, or an indication of a lack of information regarding the status of delivery of the portion of the received data; and wherein:
the aggregated fragment acknowledgement frame comprising a compressed acknowledgement status field and an expanded acknowledgement status field;
the received data is transmitted to the wireless local area network interactive device by at least one additional wireless local area network interactive device via a wireless local area network;
the wireless local area network interactive device transmits the aggregated fragment acknowledgement frame to the at least one additional wireless local area network interactive device via the wireless local area network;
the wireless local area network interactive device receives at least one additional portion of the data from the at least one additional wireless local area network interactive device based on the indicated status of the portion of the received data within the aggregated fragment acknowledgement frame;
the portion of received data comprises a plurality of packets such that at least one packet thereof includes at least one fragment portion;

the compressed acknowledgement status field comprises a plurality of two-bit pairs to indicate status of the plurality of packets of the portion of the received data;

the expanded acknowledgement status field comprises at least one bit to indicate status of at least one fragment portion of at least one packet within the plurality of packets; and the expanded acknowledgement status field comprises at least one of:

no acknowledgement status available for the at least one fragment portion;

the positive acknowledgement status for the at least one fragment portion thereby indicating that the at least one fragment portion is acknowledged as having been received properly by the wireless local area network interactive device; and the negative acknowledgement status for the at least one fragment portion thereby indicating that the at least one fragment portion is acknowledged as not having been received properly by the wireless local area network interactive device.

54. The wireless local area network interactive device of claim 53, wherein the at least one additional wireless local area network interactive device decodes the aggregated fragment acknowledgement frame.

* * * * *